(12) United States Patent
Shigitani et al.

(10) Patent No.: US 12,072,513 B2
(45) Date of Patent: Aug. 27, 2024

(54) LIGHTING DEVICE AND OPTICAL MEMBER

(71) Applicant: Panasonic Intellectual Property Management Co., Ltd., Osaka (JP)

(72) Inventors: Ryosuke Shigitani, Osaka (JP); Shumpei Fujii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 520 days.

(21) Appl. No.: 17/426,160

(22) PCT Filed: Jan. 17, 2020

(86) PCT No.: PCT/JP2020/001448
§ 371 (c)(1),
(2) Date: Jul. 28, 2021

(87) PCT Pub. No.: WO2020/162139
PCT Pub. Date: Aug. 13, 2020

(65) Prior Publication Data
US 2022/0099867 A1   Mar. 31, 2022

(30) Foreign Application Priority Data
Feb. 5, 2019   (JP) ................................. 2019-019103

(51) Int. Cl.
*G02B 5/02* (2006.01)
*F21S 2/00* (2016.01)
*F21V 7/28* (2018.01)

(52) U.S. Cl.
CPC ............ *G02B 5/0252* (2013.01); *F21S 2/005* (2013.01); *F21V 7/28* (2018.02)

(58) Field of Classification Search
CPC ........... G02B 5/0252; F21V 7/28; F21S 2/005
(Continued)

(56) References Cited

U.S. PATENT DOCUMENTS

2003/0180022 A1   9/2003  Kimura
2004/0257541 A1 * 12/2004  Iisaka .................... G02B 5/26
                                                            348/E9.027
(Continued)

FOREIGN PATENT DOCUMENTS

JP       H07-43529 A       2/1995
JP       3081668 U    *   11/2001
(Continued)

OTHER PUBLICATIONS

WO 2016096520-A1 (Year: 2024).*
(Continued)

*Primary Examiner* — Jerry L Brooks
(74) *Attorney, Agent, or Firm* — Renner, Otto, Boisselle & Sklar, LLP

(57) ABSTRACT

A lighting device which outputs output light includes: a light source; and an optical member which includes at least one of reflection wavelength selectivity or transmission wavelength selectivity depending on an incidence angle θ of incident light from the light source, wherein the incident light is incident on the optical member at a plurality of different incidence angles θ, the incident light is converted into outgoing light through the optical member, the outgoing light includes reflected light reflected by the optical member and transmitted light transmitted through the optical member, the output light is light based on the outgoing light, and chromaticity of the output light continuously changes on a surface irradiated by the output light.

8 Claims, 10 Drawing Sheets

(58) Field of Classification Search
USPC .......................................................... 359/599
See application file for complete search history.

(56) References Cited

U.S. PATENT DOCUMENTS

| | | |
|---|---|---|
| 2008/0305968 A1 | 12/2008 | Nakamura et al. |
| 2010/0264913 A1 | 10/2010 | Sandhu |
| 2012/0142860 A1 | 6/2012 | Yamanaka et al. |
| 2013/0228818 A1 | 9/2013 | Suzuki |
| 2015/0249187 A1 | 9/2015 | Inada et al. |

FOREIGN PATENT DOCUMENTS

| | | | |
|---|---|---|---|
| JP | 3081668 U | 11/2001 | |
| JP | 2002-174708 A | 6/2002 | |
| JP | 2008-303261 A | 12/2008 | |
| JP | 2010-157418 A | 7/2010 | |
| JP | 2011-084689 A | 4/2011 | |
| JP | 2015-050124 A | 3/2015 | |
| JP | 2015-108830 A | 6/2015 | |
| JP | 2016-034012 A | 3/2016 | |
| JP | 2017-3841 A | 1/2017 | |
| JP | 2017-173372 A | 9/2017 | |
| WO | 2010/021032 A1 | 2/2010 | |
| WO | 2011/024709 A1 | 3/2011 | |
| WO | 2012/067075 A1 | 5/2012 | |
| WO | WO-2016096520 A1 * | 6/2016 | ........... A61B 5/0537 |
| WO | WO-2017118140 A1 * | 7/2017 | ......... G02B 27/2214 |

OTHER PUBLICATIONS

International Search Report for corresponding Application No. PCT/JP2020/001448, mailed Mar. 24, 2020.

Written Opinion for corresponding Application No. PCT/JP2020/001448, mailed Mar. 24, 2020.

Office Action dated May 28, 2023 corresponding to Chinese Patent Application No. 202080010853.7.

Translation of the Search Report accompanying the Office Action dated May 28, 2023 corresponding to Chinese Patent Application 202080010853.7.

\* cited by examiner (a)

(b)

(a)

(b)

(a)

(b)

(a)

(b)

LIGHTING DEVICE AND OPTICAL MEMBER

TECHNICAL FIELD

The present invention relates to a lighting device and an optical member.

BACKGROUND ART

Lighting devices including a light source which emits light of mutually different colors have been conventionally and widely used in the field of space production.

A lighting device disclosed in Patent Literature (PTL) 1 includes a plurality of light sources composed of a light-emitting diode. The plurality of light sources respectively emit light of different colors to form a plurality of irradiated surfaces, which have an intermediate region having a mixed color obtained by mixing the light of the different colors partially superposed on each other.

CITATION LIST

Patent Literature

PTL 1: Japanese Unexamined Patent Application Publication No. 2010-157418

SUMMARY OF INVENTION

Technical Problem

A gradation illumination has drawn great attention as one space production. The conventional lighting device described above includes the plurality of light sources which respectively emit the light of the different colors and is thus usable as a gradation illumination. However, the conventional lighting device has different output characteristics and emission lives depending on the different light sources and has difficulties in controlling the light on the irradiated surfaces and has low long-term reliability.

Thus, it is an object of the present invention to provide a lighting device and an optical member which has high color rendering and is usable as a gradation illumination even without including a plurality of light sources which emit light of different colors,

Solution to Problem

In order to address the object described above, according to one aspect of the present invention, a lighting device which outputs output light, the lighting device includes: a light source; and an optical member which includes at least one of reflection wavelength selectivity or transmission wavelength selectivity depending on an incidence angle of incident light from the light source, wherein the incident light is incident on the optical member at a plurality of different incidence angles, the incident light is converted into outgoing light through the optical member, the outgoing light includes reflected light reflected by the optical member and transmitted light transmitted through the optical member, the output light is light based on the outgoing light, and chromaticity of the output light continuously changes on a surface irradiated by the output light.

According to another aspect of the present invention, an optical member used for a lighting device which outputs output light has at least one of reflection wavelength selectivity or transmission wavelength selectivity depending on an incidence angle of incident light, receives the incident light which is incident at a plurality of different incidence angles, converts the incident light into outgoing light, wherein the outgoing light includes reflected light subjected to reflection and transmitted light subjected to transmission, the output light is light based on the outgoing light, and chromaticity of the output light continuously changes on a surface irradiated by the output light.

Advantageous Effects of Invention

The present invention can provide a lighting device and an optical member which is usable as a gradation illumination and provides high rendering even without including a plurality of light sources which emit light of different colors.

DESCRIPTION OF EMBODIMENTS

Hereinafter, the embodiments of the present invention will be described with reference to the drawings. The embodiments described below each illustrate one detailed example of the present invention. Therefore, numerical values, shapes, materials, components, arrangement positions and connection modes of the components, etc. illustrated in the embodiments below are each one example and not intended to limit the present invention in any manner. Therefore, of the components in the embodiments described below, those not described in any independent claim indicating the highest concept of the present invention will be described as optional components.

Note that each of the drawings is a schematic diagram and not necessarily provides a precise illustration. Moreover, substantially same configurations will be provided with same signs and overlapping description will be omitted or simplified.

Embodiment 1

[Configuration]

First, the configuration of lighting device 1 according to the present embodiment will be described with reference to FIGS. 1 and 2.

Figure 1:
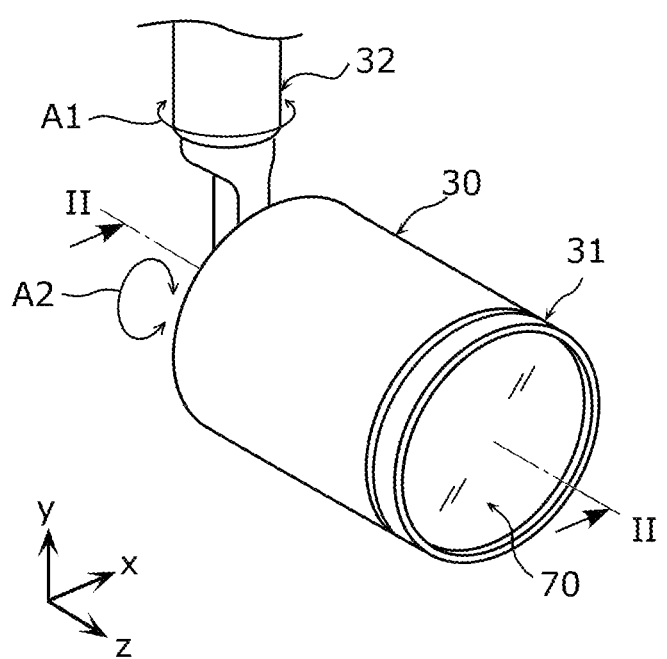
FIG. 1 is a perspective view illustrating the outer appearance of a lighting device according to Embodiment 1.

FIG. 1 is a perspective view illustrating the outer appearance of lighting device 1 according to the present embodiment. FIG. 2 is a sectional view of lighting device 1, taken along line II-II in FIG. 1. Note that a longitudinal direction of lighting device 1 is defined as a z-axis direction and mutually orthogonal two directions perpendicular to the z-axis direction are an x-axis direction and a y-axis direction in each of the drawings. In the present embodiment, the y-axis direction is a vertical direction. Moreover, an upward direction denotes a positive y-axis direction, and a downward direction denotes a negative y-axis direction. FIG. 2 illustrates a section parallel to a plane yz of lighting device 1. Moreover, whites arrow illustrated in FIG. 2 denote travel directions of light.

Lighting device 1 of the present embodiment is a device which is attached to an attachment surface such as a ceiling surface, a floor surface, or a wall surface in a space. In the present embodiment, lighting device 1 is a lighting device such as a spotlight.

Lighting device 1 outputs output light 71. Lighting device 1 includes light source 10 and optical member 50. Lighting device 1 of the present embodiment further includes housing 30, holder 31, supporter 32, and translucent member 70.

Hereinafter, each of components of lighting device 1 will be described. First, the outer appearance of lighting device 1 will be described.

Housing 30 and holder 31 are members inside of which light source 10, optical member 50, and translucent member 70 are stored.

Housing 30 is a member which is formed of, for example, a metallic material and has a bottomed, cylindrical structure. Housing 30 is attached to, for example, the ceiling surface in the space with supporter 32, which is connected to an outer bottom surface of housing 30, in between.

Supporter 32 is a member which connects together housing 30 and a portion of the attachment to the ceiling surface. Supporter 32 is formed of, for example, a metallic material and is capable of turning (arrow A1 in FIG. 1) in a horizontal direction (along a plane xz) at the portion of the attachment to the ceiling surface. Moreover, supporter 32 supports housing 30 at a portion of the connection with housing 30 in a manner such that housing 30 is capable of turning (arrow A2 in FIG. 1) in a vertical direction (along a plane yz). The horizontal turning of supporter 32 and the vertical turning of housing 30 can be combined together to adjust the posture of lighting device 1.

Holder 31 is a member which is formed of, for example, a metallic material and has a bottomless, cylindrical structure, and is connected to housing 30. Further, holder 31 is a detachable structure which can be removed from housing 30. Moreover, although not illustrated, in order to provide the detachable structure, a detachable adhesive material may be installed at a portion where housing 30 and holder 31 make contact with each other. Alternatively, a screw mountain and a screw groove may be formed at the portion where housing 30 and holder 31 make contact with each other.

Moreover, housing 30 and holder 31 store, in cylinders thereof, light source 10, optical member 50, and translucent member 70.

Next, an inner structure of lighting device 1 will be described.

Light source 10 emits light towards optical member 50. Further, light source 10 according to the present embodiment emits diffused light. In the present embodiment, one light source 10 is stored in housing 30 and isotropically emits white diffused light. More specifically, light source 10 has substrate 11, light-emitting element 12, and wavelength conversion layer 13.

Substrate 11 is a substrate on which light source 10 is mounted and has a metal wire for supplying power to light source 10.

Light-emitting element 12 is, for example, a light emitting diode (LED). Light-emitting element 12 is, for example, a blue LED which emits blue light in the present embodiment. Note that a laser diode instead of the LED can be used as light-emitting element 12.

Wavelength conversion layer 13 is a layer which converts the wavelength of light emitted by light-emitting element 12. More specifically, wavelength conversion layer 13 is formed of a translucent resin material containing yellow phosphor particles as a wavelength conversion material. Moreover, wavelength conversion layer 13 may be a sealing layer which seals light-emitting element 12. For example, a silicone resin is used as the translucent resin material, but, for example, an epoxy resin or a urea resin may also be used. Moreover, for example, Yttrium aluminum garnet (YAG)-based phosphor particles are adopted as the yellow phosphor particles.

With the aforementioned configuration, part of blue light emitted by light-emitting element 12 is subjected to wavelength conversion into yellow light by the yellow phosphor particles contained in wavelength conversion layer 13. Then the blue light not absorbed by the yellow phosphor particles and the yellow light subjected to the wavelength conversion by the yellow phosphor particles are diffused and mixed at wavelength conversion layer 13. Consequently, white light is released as diffused light from wavelength conversion layer 13.

Light source 10 is located on an inner bottom surface of housing 30 as the bottomed, cylindrical structure. Specifically, light source 10 is provided so that a surface of substrate 11 on which light-emitting element 12 is not formed and the inner bottom surface of housing 30 make contact with each other. Providing such a configuration enables light source 10 to emit light from the inner bottom surface of housing 30 towards an opening part side (a side in a positive z-axis direction) of housing 30. The light emitted from light source 10 turns into incident light 21 and arrives at optical member 50.

Where an incidence angle of incident light 21 from light source 10 is defined an incidence angle θ, incident light 21 is incident on optical member 50 at a plurality of different incidence angles θ. Note that since light source 10 according to the present embodiment emits diffused light, the incidence angle θ can be set to a wider range of values.

Optical member 50 has at least one of reflection wavelength selectivity and transmission wavelength selectivity dependent on the incidence angle θ of incident light 21 from light source 10. Specifically, optical member 50 selectively reflects part of incident light 21, depending on the incidence angle θ. Alternatively, optical member 50 selectively transmits part of incident light 21, depending on the incidence angle θ. Optical member 50 has the reflection wavelength selectivity and the transmission wavelength selectivity in the present embodiment. Thus, optical member 50 selectively reflects part of incident light 21 and transmits another part of incident light 21, depending on the incidence angle θ.

Moreover, incident light 21 is converted into outgoing light 51 via optical member 50. Moreover, outgoing light 51 includes reflected light 53 which is reflected by optical member 50 and transmitted light 52 which is transmitted through optical member 50. That is, incident light 21 arriving at optical member 50 turns into reflected light 53 when reflected by optical member 50 while incident light 21 described above turns into transmitted light 52 when transmitted through optical member 50.

In the present embodiment, optical member 50 is located more closely the opening part side (the side in the positive z-axis direction) of housing 30 than light source 10 and is sandwiched by housing 30 and holder 31. Since optical member 50 is located more closely to the opening part side of housing 30 than light source 10, light from light source 10 is incident on optical member 50 as described above. Further, optical member 50 releases outgoing light 51 towards translucent member 70. In the present embodiment, optical member 50 releases transmitted light 52 as part of outgoing light 51 towards translucent member 70.

Optical member 50 of the present embodiment has a disk structure and in contact with an inner curved surface of holder 31 having a cylindrical structure. Providing such a configuration permits the light emitted from light source 10 to be efficiently incident on optical member 50. Moreover, although not illustrated, optical member 50 may be in contact with the inner curved surface of holder 31 with a seal component such as a gasket, a packing, or an O ring in between.

As described above, holder 31 has a detachable structure which is removable from housing 30. Thus, optical member 50 sandwiched by housing 30 and holder 31 can be removed from housing 30 and holder 31 by removing holder 31 from housing 30. Therefore, optical member 50 has a detachable structure.

Optical member 50 has dielectric multilayer film 62, colloidal crystal layer 82, or periodic uneven layer 92. Moreover, optical member 50 may have a cholesteric liquid crystal layer. Optical member 50 is only required to have at least one of dielectric multilayer film 62, colloidal crystal layer 82, periodic uneven layer 92, and the cholesteric liquid crystal layer. Optical member 50 may further have a plurality of films or layers of different types or may have a plurality of films or layers of the same type.

Note that since optical member 50 is only required to have at least one of the reflection wavelength selectivity and the transmission wavelength selectivity depending on the incidence angle θ of incident light 21 from light source 10, optical member 50 may have a configuration other than the configuration described above.

Optical member 50 according to the present embodiment has dielectric multilayer film 62. More specifically, optical member 50 according to the present embodiment is dielectric multilayer film structure 60 including dielectric multilayer film 62 and substrate 61.

Dielectric multilayer film 62 has a structure in which a plurality of dielectric materials with different dielectric constants are superposed on each other. For example, dielectric multilayer film 62 has a structure in which a dielectric film with a low refractive index and a dielectric film with a high refractive index are alternately superposed. Under condition that the phase of light reflected on an interface between the dielectric film with the low refractive index and the dielectric film with the high refractive index matches the phase of light reciprocating at dielectric multilayer film 62, both beams of light intensify each other in the same reflection direction, as a result of which a film with high reflectance is provided. Moreover, a change in the incidence angle θ of incident light 21 on dielectric multilayer film structure 60 changes an optical path length of the light reciprocating at dielectric multilayer film 62, so that the wavelength of the light reflected in the mutually intensifying direction changes. Moreover, when dielectric multilayer film structure 60 has optical transmittance, the wavelength of the reflected light changes and thus the wavelength of the transmitted light similarly changes.

Specifically, dielectric multilayer film structure 60 has at least one of the reflection wavelength selectivity and the transmission wavelength selectivity dependent on the incidence angle θ of incident light 21. In the present embodiment, dielectric multilayer film structure 60 has both the reflection wavelength selectivity and the transmission wavelength selectivity. That is, dielectric multilayer film structure 60 selectively reflects part of incident light 21 and selectively transmits another part of incident light 21, depending on the incidence angle θ.

Figure 2:
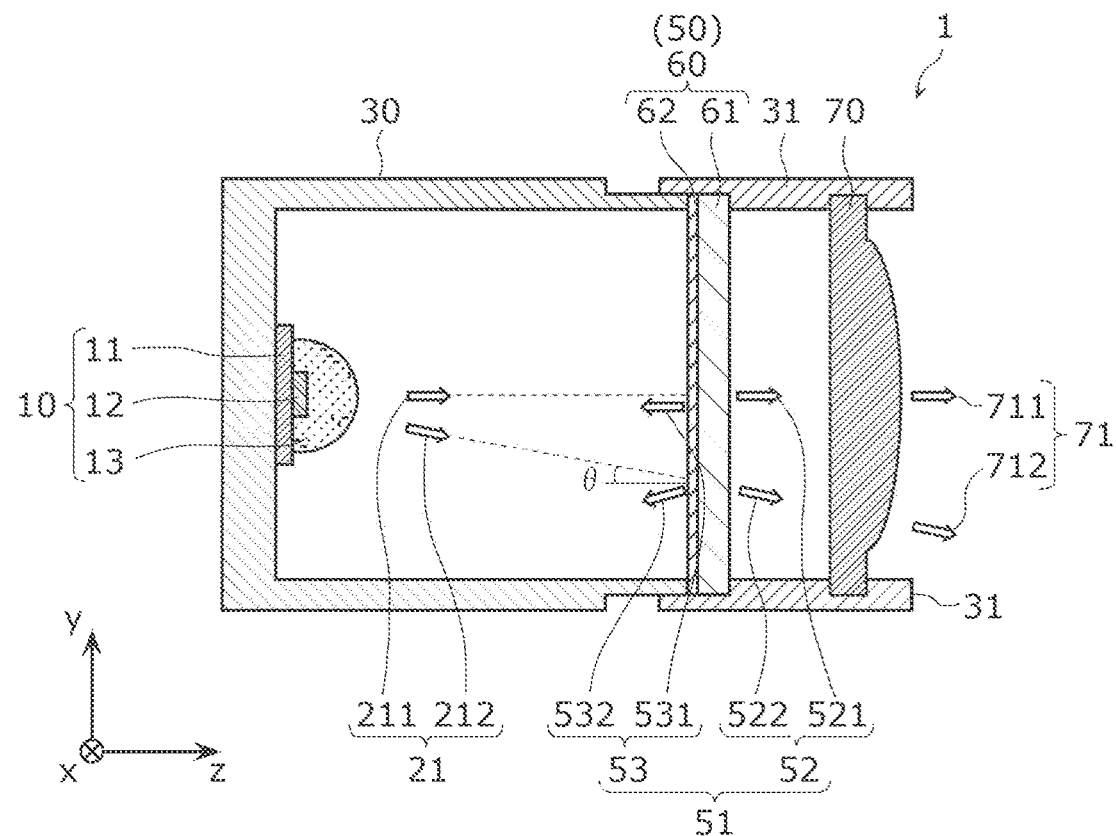
FIG. 2 is a sectional view of the lighting device, taken along line II-II in FIG. 1.

As illustrated in FIG. 2, dielectric multilayer film 62 is only required to be arranged in contact with substrate 61. In the present embodiment, dielectric multilayer film 62 is arranged on a surface of substrate 61 on a side in which the negative z-axis direction extends.

Substrate 61 preferably has high translucency. For example, the visible light transmittance of substrate 61 is preferably 80% to 100% and more preferably 85% to 100%.

For example, a glass plate of, for example, soda-lime glass, low-alkali borosilicate glass, or non-alkali-aluminoborosilicate glass can be used as substrate 61. Moreover, a resin plate of, for example, polycarbonate, acrylic resin, or polyethylene terephthalate can also be used. Further, in addition to hard materials such as the glass plate and the resin plate, a flexible material such as a film can also be used as substrate 61.

For example, substrate 61 may be, for example, a resin film. Materials that can be used for the resin film include: polyethylene terephthalate (PET), polyethylene (PE), polypropylene (PP), polyvinyl chloride (PVC), polystyrene (PS), and polyvinyl acetate (PVAc). The size and shape of structure 61 are not specifically limited. Substrate has an appropriate size and shape in accordance with an application purpose, application environment, etc.

Moreover, for example, a dichroic mirror or a notch filter can be used as dielectric multilayer film structure 60. A TS Dichroic Mirror Green (manufactured by Edmond Optics Japan) as one example of the dichroic mirror is used as dielectric multilayer film structure 60 in the present embodiment.

Translucent member 70 is a member which is formed of a material with high optical transparency. Moreover, translucent member 70 may be a member which transmits light without scattering the light. For example, translucent member 70 is formed of a translucent resin material such as acrylic or polycarbonate or a translucent material such as glass a material. Translucent member 70 of the present embodiment is formed of a glass material.

Further, translucent member 70 of the present embodiment has a disk structure and has a convex structure on one circular surface of the disk structure, thus functioning as a convex lens. Thus, translucent member 70 controls the distribution of light emitted from light source 10. However, the shape of translucent member 70 is not limited to the aforementioned shape and translucent member 70 may also have a flat structure or any other shape such as, for example, a single-concave lens, a double-concave lens, or a double-convex lens.

Translucent member 70 is arranged with a curved surface of the disk in contact with the inner curved surface of holder 31. Moreover, holder 31 is located at an opening part of housing 30, that is, located more closely to a direction (the positive z-axis direction) in which light is emitted from light source 10 than housing 30.

As described above, optical member 50 releases transmitted light 52 as part of outgoing light 51 towards translucent member 70 in the present embodiment. Moreover, translucent member 70 is a member formed of a material with high optical transparency. Thus, translucent member 70 transmits outgoing light 51 released from optical member 50. The light transmitted through translucent member 70 turns into light outputted from lighting device 1, that is, output light 71. That is, output light 71 is light based on outgoing light 51.

On the other hand, outgoing light 51 includes transmitted light 52 and reflected light 53 but reflected light 53 is confined in housing 30 and thus cannot be used as output light 71. Therefore, output light 71 includes transmitted light 52 included in outgoing light 51 in the present embodiment. Lighting device 1 of the present embodiment uses, as output light 71, the light (transmitted light 52) transmitted through optical member 50.

For example, lighting device 1 according to the present embodiment may be configured to include no translucent member 70. In the aforementioned case, light released in the positive z-axis direction from optical member 50 turns into output light 71 not via translucent member 70.

Lighting device 1 according to the present embodiment further includes a controller and a power supply, not illustrated.

The controller is a controller which is electrically connected to light source 10 and controls lighting and light-off of light source 10. The controller is realized by a microcomputer, a processor, or the like or a dedicated circuit.

The power supply is a power conversion circuit which converts, into a DC power, an AC power supplied from a power system such as, for example, a commercial power source. The power supply is formed by a power source circuit which generates a power for causing emission of light source 10. The power supply, for example, rectifies, smoothens, or steps down the AC power supplied from the commercial power source to thereby convert the aforementioned AC power into a DC power at a predetermined level and supplies the aforementioned DC power to light source 10. The power supply is electrically connected to the power system by a power line or the like.

Here, the behavior of incident light 211 and incident light 212 which are included in incident light 21 and have different incidence angles θ of incidence on optical member 50 will be described. Light source 10 emits diffused light and thus has incident light 21 having mutually different incidence angles θ. The mutually different incidence angles θ are continuous and not disconnected when incident light 21 is incident. That is, light source 10 emits incident light 21, whose incidence angle θ continuously changes, towards optical member 50. As one example of such a case, incident light 211 and incident light 212 having the mutually different incidence angles θ are present.

Incident light 211 and incident light 212 as the light emitted from light source 10 serving as a white light source have equal chromaticity until reaching optical member 50.

Upon reaching optical member 50, incident light 211 is transmitted through and reflected by optical member 50, turning into transmitted light 521 and reflected light 531. Similarly, when reaching optical member 50, incident light 212 is transmitted through and reflected by optical member 50, turning into transmitted light 522 and reflected light 532.

Here, optical member 50 of the present embodiment selectively reflects part of incident light 21 and transmits another part of incident light 21, depending on the incidence angle θ. Thus, the reflection wavelength of reflected light 531 based on incident light 211 and the reflection wavelength of reflected light 532 based on incident light 212 differ from each other. It is needless to say that the chromaticity of reflected light 531 and the chromaticity of reflected light 532 differ from each other due to the aforementioned reflection wavelength difference. Similarly, the transmission wavelength of transmitted light 521 and the transmission wavelength of transmitted light 522 differ from each other. Moreover, the chromaticity of transmitted light 521 and the chromaticity of transmitted light 522 differ from each other due to the aforementioned transmission wavelength difference. That is, incident light 21 emitted from one light source 10 is white light and reflected light 53 and transmitted light 52 have different chromaticity in accordance with the incidence angle θ.

In lighting device 1 of the present embodiment, output light 71 is light based on transmitted light 52 as part of outgoing light 51 and thus transmitted light 521 turns into output light 711 and transmitted light 522 turns into output light 712. Moreover, translucent member 70 is formed of a material with high optical transparency, and thus the chromaticity of transmitted light 521 and the chromaticity of output light 711 are equal to each other and the chromaticity of transmitted light 522 and the chromaticity of output light 712 are equal to each other.

Specifically, since output light 71 according to the present embodiment is transmitted light 52 and transmitted light 52 has the chromaticity according to the incidence angle θ, output light 71 similarly has chromaticity according to the incidence angle θ.

Moreover, transmitted light 52 and reflected light 53 according to the present embodiment have a transmission direction and a reflection direction determined by the incidence angle θ derived from incident light 21. Since output light 71 is transmitted light 52, a direction in which output light 71 is outputted is determined by the incidence angle θ derived from incident light 21. Therefore, output light 71 is irradiated to a position of an irradiated surface according to the incidence angle θ.

Summarizing the above, for output light 71 of lighting device 1 of the present embodiment, the chromaticity of output light 71 and the position of the irradiated surface where output light 71 is irradiated are determined based on the incidence angle θ. In other words, even if lighting device 1 of the present embodiment includes only one white light source 10, output light 71 comes to have chromaticity according to the incidence angle θ as a result of passing through optical member 50 and is outputted to the position according to the incidence angle θ. It is needless to say that a slight change in the incidence angle θ slightly changes the position according to the incidence angle θ.

Note that the irradiated surface is an indoor surface of a building, for example, any of the ceiling surface, the floor surface, and the wall surface in a space. Moreover, the irradiated surface may be, for example, a surface of the outer wall and a roof of the building or may be a ground surface such as a road outdoors. Further, the irradiated surface is not limited to one surface and may be a plurality of surfaces, for example, the ceiling surface and the wall surface in the space. Moreover, the irradiated surface is not limited to a flat surface and may also be a curved surface or an uneven surface.

[Characteristics of Transmitted Light 52 and Reflected Light 53]

Next, the chromaticity of transmitted light 52 and reflected light 53 will be described in more detail with reference to FIGS. 3 to 5.

First, emission spectra of incident light 21 serving as a basis of transmitted light 52 and reflected light 53 will be illustrated. That is, the emission spectra of incident light 21 are emission spectra of light emitted from light source 10.

Figure 3:
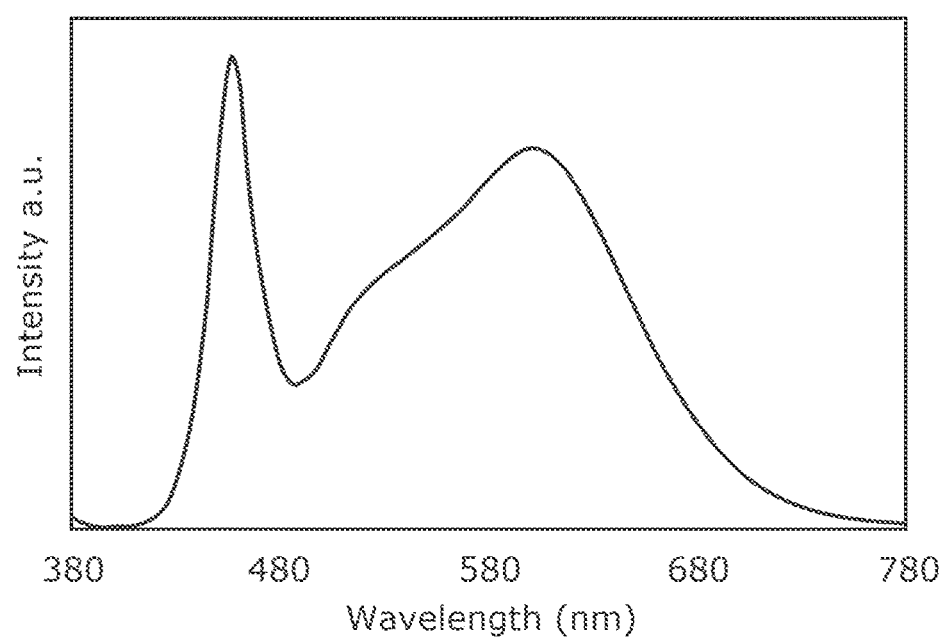
FIG. 3 is a diagram illustrating an emission spectrum of incident light emitted from a light source according to Embodiment 1.

FIG. 3 is a diagram illustrating the emission spectrum of incident light 21 emitted from light source 10 according to the present embodiment. More specifically, a vertical axis denotes emission intensity of incident light 21 and a horizontal axis denotes an emission wavelength in FIG. 3.

Light-emitting element 12 according to the present embodiment is a blue LED which has a peak at a wavelength of 455 nm. Moreover, the yellow fluorescent particles according to the present embodiment have YAG, are excited by light with a wavelength indicating a blue color, and releases strong light in a wavelength region (560 nm to 610 nm) indicating a yellow green, a yellow, and an orange colors. As illustrated in FIG. 3, the emission spectrum of incident light 21 has a component having a peak wavelength at 455 nm derived from the blue LED and a component having a peak wavelength at 600 nm derived from the YAG. As a result, the light emitted by light source 10 demonstrates a white color.

Next, the behavior by which the light emitted from light source 10, that is, incident light 21 on optical member 50 is converted into outgoing light 51 through optical member 50 will be described with reference to FIGS. 4 and 5. Note that the description will be given under assumption that optical member 50 is dielectric multilayer film structure 60 (TS dichroic mirror green) in the present embodiment.

First, transmitted light 52 will be described.

Figure 4:
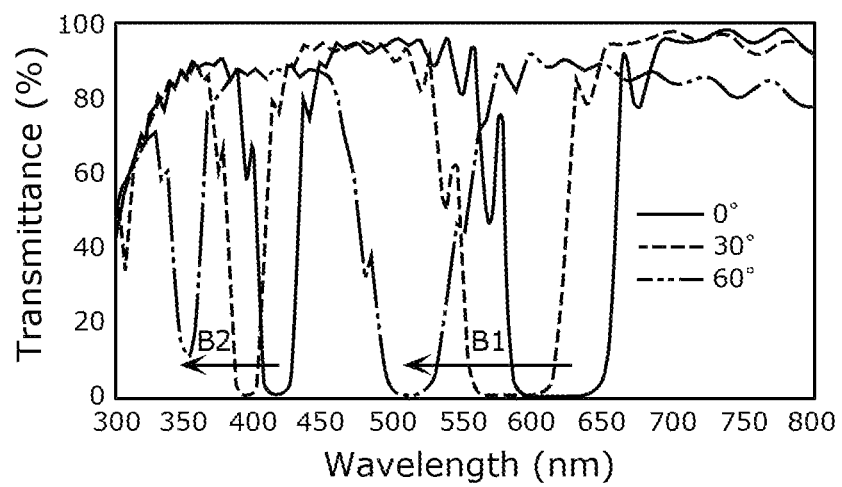
FIG. 4 is a diagram illustrating characteristics of transmitted light emitted by a dielectric multilayer film structure according to Embodiment 1.
Figure 4:
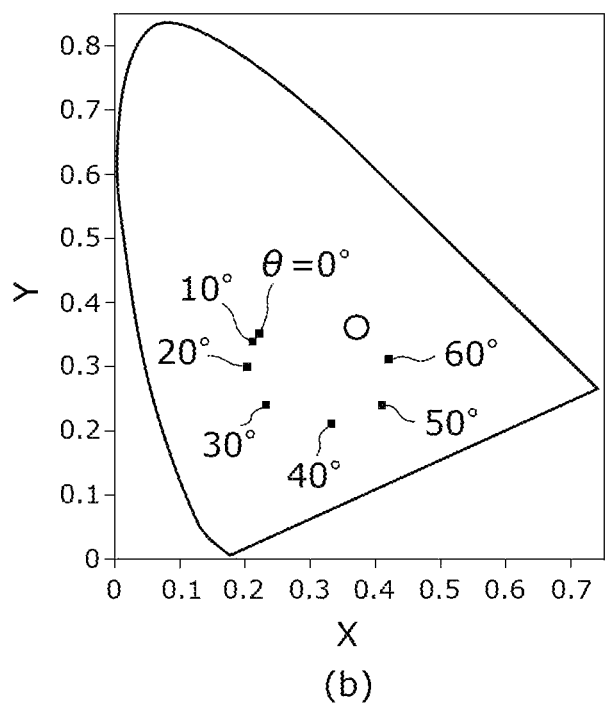

FIG. 4 is a diagram illustrating the characteristics of transmitted light 52 released by dielectric multilayer film structure 60 according to the present embodiment. More specifically, (a) in FIG. 4 is a diagram illustrating light transmission spectra of dielectric multilayer film structure 60 at different incidence angles θ. Moreover, (b) in FIG. 4 is a chromaticity diagram of transmitted light 52 of dielectric multilayer film structure 60 at the different incidence angles θ.

First, the light transmission spectra of dielectric multilayer film structure 60 will be described with reference to (a) in FIG. 4.

The light transmission spectra according to the present embodiment are spectra indicating the transmittance of dielectric multilayer film structure 60 with respect to the wavelengths of light from an ultraviolet light region to a visible light region (with wavelengths of 300 nm to 800 nm).

In FIG. 4, (a) illustrates actually measured values of the light transmission spectra where the incidence angles θ of incident light 21 on dielectric multilayer film structure 60 are 0 degrees (indicated by a solid line), 30 degrees (indicated by a dotted line), and 60 degrees (indicated by a two-dot chain line). Note that the measurement of the light transmission spectra where the incidence angles θ are 10 degrees, 20 degrees, 40 degrees, and 50 degrees were carried out but not illustrated for the purpose of avoiding complicatedness in the figure.

Here, the behavior of the light transmission spectrum following a change in the incidence angle θ of incident light 21 on dielectric multilayer film structure 60 will be described. Moreover, for the purpose of explanation, high transmittance refers to a state in which the light transmittance is greater than or equal to 50% and low transmittance refers to a state in which the light transmittance is less than 50%.

When the incidence angle θ is 0 degrees (indicated by the solid line), dielectric multilayer film structure 60 has: a region with low transmittance centered at a wavelength of 417 nm; and a region with low transmittance centered at a wavelength of 615 nm.

Here, a focus will be put on the region with the low transmittance centered at the wavelength of 615 nm in the case where the incidence angle θ is 0 degrees.

Dielectric multilayer film structure 60 also has: a region with low transmittance centered at a wavelength of 587 nm; and a region with low transmittance centered at a wavelength of 510 nm in cases where the incidence angles θ are 30 degrees (indicated by the dotted line) and 60 degrees (indicated by the two-dot chain line). That is, as illustrated by arrow B1 in (a) in FIG. 4, the region with the low transmittance shifts towards a short wavelength side following an increase in the incidence angle θ.

Similarly, a focus will be put on the region with the low transmittance centered at a wavelength of 417 nm in the case where the incidence angle θ is 0 degrees.

Dielectric multilayer film structure 60 also has: a region with low transmittance centered at a wavelength of 394 nm; and a region with low transmittance centered at a wavelength of 354 nm, in cases where the incidence angles θ are 30 degrees (indicated by the dotted line) and 60 degrees (indicated by the two-dot chain line). That is, as illustrated by arrow B2 in (a) in FIG. 4, the region with low transmittance shifts towards the short wavelength side following an increase in the incidence angle θ.

Moreover, the same trends are also identified for the light transmittance spectra in cases where the incidence angles θ are 10 degrees, 20 degrees, 40 degrees, and 50 degrees, although not illustrated.

Specifically, (a) in FIG. 4 illustrates that the region with low transmittance in the light transmittance spectrum of dielectric multilayer film structure 60 changes following a change in the incidence angle θ. Moreover, dielectric multilayer film structure 60 shows high transmittance at wavelengths other than those in the aforementioned region with low transmittance. That is, a region with high transmittance changes in the light transmittance spectrum of dielectric multilayer film structure 60 following the change in the incidence angle θ. Therefore, the light transmittance spectrum of dielectric multilayer film structure 60 changes following the change in the incidence angle θ.

Moreover, in view of the principles of dielectric multilayer film structure 60, it is illustrated that a continuous change in the incidence angle θ continuously changes the light transmission spectrum.

As described above, the change in the incidence angle θ of incident light 21 on dielectric multilayer film structure 60 changes the optical path length of light reciprocating at dielectric multilayer film 62, and thus the wavelength of light reflected in the mutually intensifying direction changes. For example, where the change in the incidence angle θ is also very small, the change in the optical path length of the reciprocating light is very small and the wavelength change of the reflected light is also very small. Therefore, the continuous change in the incidence angle θ also continuously changes the wavelength of the reflected light.

Moreover, dielectric multilayer film structure 60 selectively reflects part of incident light 21 and transmits another part of incident light 21, depending on the incidence angle θ. Thus, the continuous change in the incidence angle θ also continuously changes the wavelength of the reflected light and also similarly continuously changes the wavelength of the transmitted light. That is, the continuous change in the incidence angle θ continuously changes the light transmission spectrum.

Next, the chromaticity of transmitted light 52 will be described with reference to (b) in FIG. 4. A chromaticity diagram illustrated in the present embodiment is a chromaticity diagram (hereinafter referred to as chromaticity diagram) defined by International Commission on Illumination (CIE 1931).

In the chromaticity diagram, the chromaticity means that red is stronger with an increase in x and blue is stronger with a decrease in x, and green is stronger with an increase in y and blue is stronger with a decrease in y.

The chromaticity of transmitted light 52 is calculated through simulation using the emission spectrum of incident light 21 emitted from light source 10 illustrated in FIG. 3 and the light transmission spectra illustrated in (a) in FIG. 4. More specifically, a black square in (b) in FIG. 4 denotes the chromaticity of transmitted light 52 when the incidence angle θ is changed every 10 degrees from 0 to 60 degrees. Moreover, a white circle denotes the chromaticity of incident light 21 emitted from light source 10, which chromaticity is calculated from the emission spectrum of light source 10.

As illustrated in (b) in FIG. 4, xy coordinates of the black squares change following the change in the incidence angle θ. That is, the chromaticity of transmitted light 52 changes following the change in the incidence angle θ.

As illustrated in (a) in FIG. 4, a continuous change in the incidence angle θ continuously changes the light transmission spectrum, and thus the chromaticity of transmitted light 52 continuously changes.

Specifically, incident light 21 emitted by light source 10 continuously changes the incidence angle θ and thus the chromaticity of transmitted light 52 has continuously changes in the present embodiment.

Moreover, output light 71 is transmitted light 52 in lighting device 1. Therefore, the chromaticity of output light 71 continuously changes. Furthermore, as described above, output light 71 is irradiated to a position of the irradiated surface according to the incidence angle θ.

Summarizing the above, even if lighting device 1 of the present embodiment includes only one white light source 10, the chromaticity of output light 71 on the irradiated surface irradiated by output light 71 continuously changes. Further, the chromaticity of output light 71 continuously changes when output light 71 is irradiated to the irradiated surface. Output light 71 turns into so-called light demonstrating gradation on the irradiated surface.

Therefore, lighting device 1 has high color rendering usable as a gradation illumination even without including a plurality of light sources which emit light of different colors, that is, even when including only one white light source 10.

Next, reflected light 53 will be described.

Figure 5:
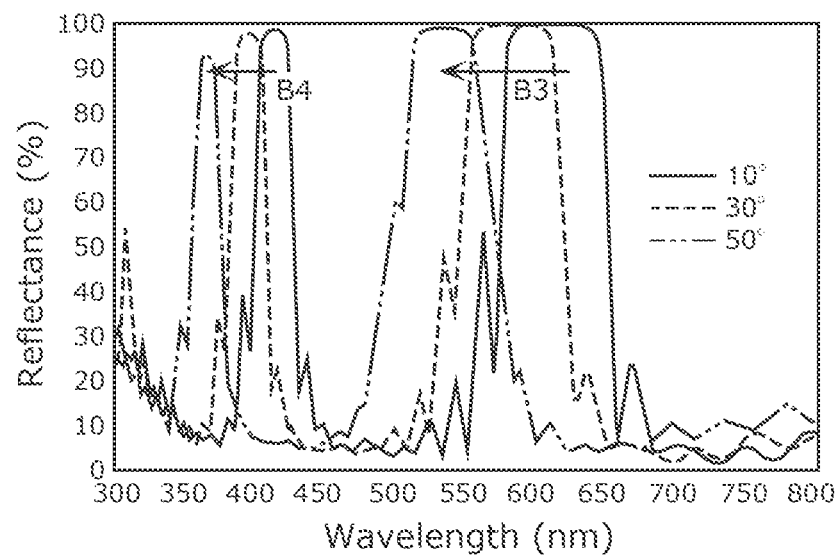
FIG. 5 is a diagram illustrating characteristics of reflected light released by the dielectric multilayer film structure according to Embodiment 1.
Figure 5:
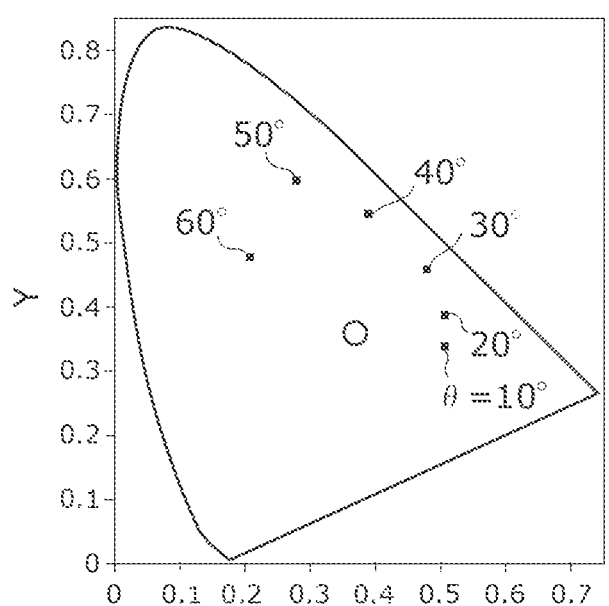

FIG. 5 is a diagram illustrating characteristics of reflected light 53 released by dielectric multilayer film structure 60 according to the present embodiment. More specifically, (a) in FIG. 5 is a diagram illustrating light reflection spectra of dielectric multilayer film structure 60 at different incidence angles θ. Moreover, (b) in FIG. 5 is a chromaticity diagram of reflected light 53 of dielectric multilayer film structure 60 at the different incidence angles θ.

First, the light reflection spectrum of dielectric multilayer film structure 60 will be described with reference to (a) in FIG. 5.

The light reflection spectrum according to the present embodiment is a spectrum indicating the reflectance of different wavelengths of dielectric multilayer film structure 60 with respect to light wavelengths between an ultraviolet light region and a visible light region (with wavelengths of 300 nm to 800 nm).

In FIG. 5, (a) illustrates actually measured values of the light reflection spectra where the incidence angles θ of incident light 21 on dielectric multilayer film structure 60 are 10 degrees (indicated by a solid line), 30 degrees (indicated by a dotted line), and 50 degrees (indicated by a two-dot chain line). Note that the measurements of the light reflection spectra where the incidence angles θ are 20 degrees, 40 degrees, and 60 degrees were carried out but are not illustrated for the purpose of avoiding complicatedness in the figure.

Here, the behavior of the light reflection spectra following the change in the incidence angle θ of incident light 21 on dielectric multilayer film structure 60 will be described. Where the incidence angle θ is 10 degrees (indicated by the solid line), dielectric multilayer film structure 60 has: a region with high reflectance centered at a wavelength of 414 nm; and a region with high reflectance centered at a wavelength of 613 nm.

Here, a focus will be put on the region with the high reflectance centered at the wavelength of 613 nm where the incidence angle θ is 0 degrees. Even at incidence angles θ of 30 degrees (indicated by the dotted line) and 50 degrees (indicated by the two-dot chain line), dielectric multilayer film structure 60 has: a region with high reflectance centered at a wavelength of 587 nm; and a region with high reflectance centered at a wavelength of 525 nm. That is, as illustrated by arrow B3 in (a) in FIG. 5, the region with the high reflectance shifts towards a short wavelength side following an increase in the incidence angle θ.

Similarly, a focus will be put on the region with the high reflectance centered at the wavelength of 414 nm when the incidence angle θ is 10 degrees. Even at the incidence angles θ of 30 degrees (indicated by the dotted line) and 60 degrees (indicated by the two-dot chain line), dielectric multilayer film structure 60 has: a region with high reflectance centered at a wavelength of 394 nm; and a region with high reflectance centered at a wavelength of 367 nm. That is, as illustrated by arrow B4 in (a) in FIG. 5, the region with the high reflectance shifts towards the short wavelength side with an increase in the incidence angle θ.

Moreover, the same trends can be identified for the light reflection spectra with incidence angles θ of 20 degrees, 40 degrees, and 60 degrees, although not illustrated.

That is, (a) in FIG. 5 illustrates that the region with high reflectance in the light reflection spectra of dielectric multilayer film structure 60 changes following a change in the incidence angle θ.

Moreover, as illustrated in FIG. 4, according to the principles of dielectric multilayer film structure 60, a continuous change in the incidence angle θ continuously changes the region with high reflectance. That is, a continuous change in the incidence angle θ continuously change the light reflection spectrum.

Next, the chromaticity of reflected light 53 will be described with reference to (b) in FIG. 5.

The chromaticity of reflected light 53 is calculated through simulation by use of the emission spectrum of incident light 21 emitted from light source 10 which spectrum is illustrated in FIG. 3 and the light reflection spectra illustrated in (a) in FIG. 5. More specifically, black squares in (b) in FIG. 5 denote the chromaticity of reflected light 53 where the incidence angle θ is changed every 10 degrees from 10 to 60 degrees. Moreover, a white circle denotes the chromaticity of incident light 21 emitted from light source 10, which chromaticity is calculated from the emission spectrum of light source 10.

As illustrated in (b) in FIG. 5, xy coordinates of the black squares change following a change in the incidence angle θ.

Specifically, the chromaticity of reflected light 53 changes following the change in the incidence angle θ. As described above, since the continuous change in the incidence angle θ continuously changes the light reflection spectrum, the chromaticity of reflected light 53 continuously changes.

Summarizing the above, for incident light 21 emitted by light source 10 in the present embodiment, the incidence angle θ continuously changes and thus the chromaticity of reflected light 53 continuously changes.

Reflected light 53 of the present embodiment is confined in housing 30 and is consequently not used as output light 71. However, if reflected light 53 can be outputted as output light 71 with a configuration different from the configuration of the present embodiment, output light 71 based on reflected light 53 turns into light demonstrating gradation on the irradiated surface, as is the case with the present embodiment.

Here, another configuration of lighting device 1 according to the present embodiment will be described.

The number of light sources 10 is one in lighting device 1 according to the present embodiment but is not limited to the aforementioned number. A plurality of light sources 10 may be provided, and the plurality of light sources 10 may be different light sources. The different light sources may include light sources which respectively emit, for example, red-, green-, and blue-colored light.

For example, in a case where lighting device 1 according to the present embodiment further has a light source which emits red-colored light, output light 71 is, in addition to a gradation light based on light source 10, light of a stronger red color.

Moreover, in lighting device 1 according to the present embodiment, light source 10 emits white light but the color of the light emitted by light source 10 is not limited to white. For example, light source 10 is only required to emit not white light but only a plurality of wavelengths.

Moreover, in a case where a plurality of light sources 10 each of which emits white light are provided, the plurality of light sources 10 preferably have same output characteristics and a same emission life. For example, the same vendor and the same product number can be used for each of the plurality of light sources 10. Aa result of the above, even in a case where lighting device 1 includes a plurality of light sources 10, the output characteristics and emission life of the plurality of light sources 10 are the same, which therefore makes it easy to control output light 71 on the irradiated surface and also improves the long-term reliability.

A spotlight is used as lighting device 1 in the present embodiment. However, any of a ceiling light, downlight, bracket light, pendant light, floor stand, foot light, porch light, and garden light, etc. can be used for lighting device 1. In a case where such lighting device 1 is used, providing a configuration such that light emitted from light source 10 is incident on optical member 50 provides the same effects as the effects provided by the present embodiment.

Note that optical member 50 has a detachable structure, as described above. As a result of detaching optical member 50 from an inside of housing 30, light emitted by lighting device 1 comes to have the same chromaticity as the chromaticity of incident light 21 emitted by light source 10, that is, turns into white light. As described above, providing optical member 50 with the detachable structure makes it possible to select whether the light emitted by lighting device 1 is provided as light demonstrating gradation or white light.

Further, for example, an example of a configuration of a lighting system different from the configuration of the present embodiment will be described. The lighting system is a lighting system which outputs output light. The lighting system includes: a lighting device which includes a light source therein; and an optical member which is located outside of the lighting device and has at least one of reflection wavelength selectivity or transmission wavelength selectivity depending on the incidence angle of incidence light from the light source. The incident light is incident on the optical member at a plurality of different incidence angles, and the incident light is converted into outgoing light through the optical member. The outgoing light includes reflected light reflected by the optical member and transmitted light transmitted through the optical member. The output light is light based on the outgoing light and the chromaticity of the output light continuously changes on the surface irradiated by the output light.

In such a lighting system, upon the incidence of part of the light emitted from the light source included in the lighting device on the optical member, the incident light is converted into outgoing light through the optical member. Moreover, the lighting device and the optical member are set at positions separated from each other by a predetermined distance. The positions separated from each other by the predetermined distance are such positions that are separated from each other in a manner such that part of the light emitted from the light source included in the lighting device is incident on the optical member. The output light in the lighting system is light based on the outgoing light and the chromaticity of the output light continuously changes on the surface irradiated by the output light.

That is, such a lighting system has high color rendering usable as a graduation lighting system even without including a plurality of light sources which emit light of different colors, that is, as a result of including a single light source.

[Effects and Others]

As described above, lighting device 1 according to the present embodiment is lighting device 1 which outputs output light 71. Lighting device 1 includes: light source 10; and optical member 50 which has at least one of reflection wavelength selectivity and transmission wavelength selectivity depending on the incidence angle θ of incident light 21 from light source 10. Incident light 21 is incident on optical member 50 at the plurality of different incidence angles θ and is converted into outgoing light 51 through optical member 50. Outgoing light 51 includes: reflected light 53 which is reflected by optical member 50; and transmitted light 52 which is transmitted through optical member 50. Output light 71 is light based on outgoing light 51 and the chromaticity of output light 71 continuously changes on the surface irradiated by output light 71.

Consequently, for output light 71, the chromaticity of output light 71 and the irradiation position on the surface irradiated by output light 71 are determined based on the incidence angle θ. That is, lighting device 1 has high color rendering usable as gradation illumination even without including a plurality of light sources which emit light of different colors, that is, even when including only one white light source 10.

Moreover, incident light 21 is diffused light in lighting device 1 according to the present embodiment.

Consequently, the incidence angle θ can be set to a wider value. Thus, the chromaticity of output light 71 can also be similarly set to a wider value.

Moreover, optical member 50 has dielectric multilayer film 62 in lighting device 1 according to the present embodiment.

Consequently, optical member 50 having high wavelength selectivity can be used.

Moreover, optical member 50 according to the present embodiment is optical member 50 which is used in lighting device 1 which outputs output light 71. Optical member 50 has at least one of the reflection wavelength selectivity or the transmission wavelength selectivity depending on the incidence angle θ of incident light 21, and upon the incidence of incident light 21 having the plurality of different incidence angles θ, optical member 50 converts incident light 21 into outgoing light 51. Outgoing light 51 includes reflected light 53 and transmitted light 52. Output light 71 is light based on outgoing light 51 and the chromaticity of output light 71 continuously changes on the surface irradiated by output light 71.

Consequently, for output light 71, the chromaticity of output light 71 and the irradiation position on the surface irradiated by output light 71 are determined based on the incidence angle θ. That is, lighting device 1 has high color rendering usable as a gradation illumination even without including a plurality of light sources which emit light of different colors, that is, even when including only one white light source 10.

Variation 1 of Embodiment 1

Dielectric multilayer film structure 60 is used as optical member 50 in Embodiment 1. However, optical member 50 may be colloidal crystal layer structure 80, periodic uneven layer structure 90, or cholesteric liquid crystal structure. Variation 1 of Embodiment 1 differs from Embodiment 1 in that colloidal crystal layer structure 80 is used as optical member 50. Note that components in Variation 1 of Embodiment 1 which are common to the components of Embodiment 1 will be omitted from a detailed description.

Specifically, colloidal crystal layer structure 80 serving as optical member 50 is located more closely (in a positive z-axis direction) to an opening part of housing 30 than light source 10 and is sandwiched by housing 30 and holder 31. Further, colloidal crystal layer structure 80 serving as optical member 50 has a disk structure and makes contact with the inner surface of holder 31 which similarly has a cylindrical structure. Moreover, incident light 21 is incident on colloidal crystal layer structure 80. Further, outgoing light 51 (that is, transmitted light 52 and reflected light 53) are released from colloidal crystal layer structure 80.

Further, configurations of periodic uneven layer structure 90 and the cholesteric liquid crystal structure, which are used as optical member 50, will also be described here.

[Configuration]

Figure 6:
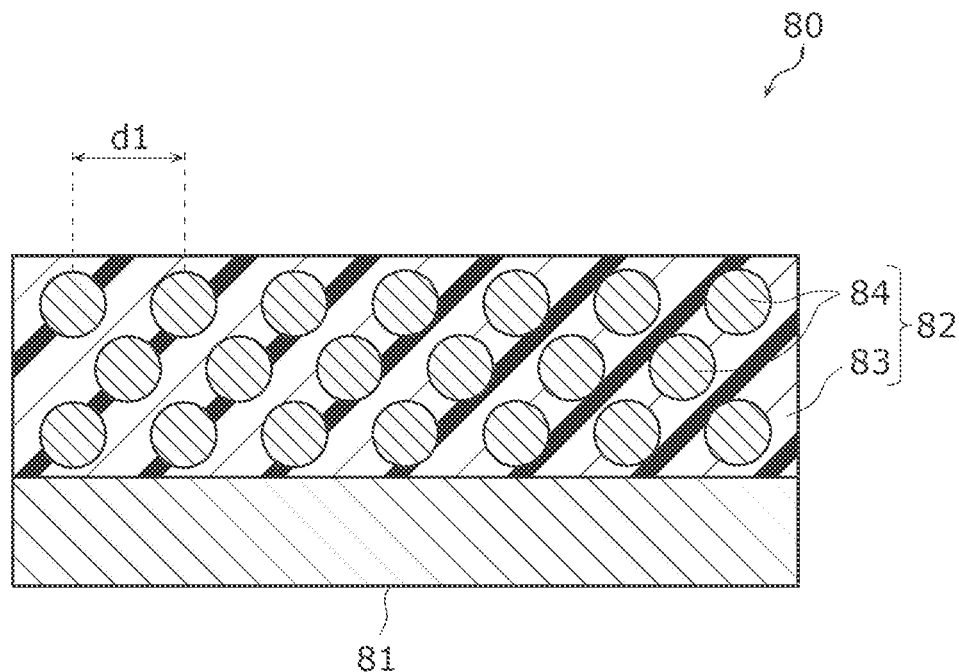
FIG. 6 is a sectional view illustrating a colloidal crystal layer structure according to Variation 1 of Embodiment 1.

First, colloidal crystal layer structure 80 will be described. FIG. 6 is a sectional view illustrating colloidal crystal layer structure 80 according to Variation 1 of the present embodiment.

Colloidal crystal layer structure 80 includes substrate 81 and colloidal crystal layer 82. Colloidal crystal layer 82 includes binder 83 and a plurality of particles 84. Binder 83 is arranged between the plurality of particles 84. The plurality of particles 84 having a size of the colloid dimension are regularly and three-dimensionally arrayed at intervals of inter-center distance d1 of particles 84 in colloidal crystal layer 82 according to the present variation. However, the array of the plurality of particles 84 does not necessarily have to have strict regularity as long as the object of the present variation is not impaired.

Substrate 81 preferably has high transmittance. For example, the visible light transmittance of substrate 81 is preferably 80% to 100% and more favorably 85% to 100%.

A glass plate of, for example, soda-lime glass, low-alkali borosilicate glass, or non-alkali aluminoborosilicate glass can be used for substrate 81. A resin plate of, for example, polycarbonate, acrylic resin, or polyethylene terephthalate can also be used. Further, in addition to a hard material such as the glass plate and the resin plate, a flexible material such as a film can also be used for substrate 81.

For example, substrate 81 may be, for example, a resin film. For example, polyethylene terephthalate (PET), polyethylene (PE), polypropylene (PP), polyvinyl chloride (PVC), polystyrene (PS), or polyvinyl acetate (PVAc) can be used as a material of the resin film. The size and the shape of substrate 81 are not specifically limited. Substrate 81 has a size and a shape according to the use purpose, use environment, etc.

The shape of substrate 81 is not specifically limited and can be formed into, for example, a film-like shape. Moreover, the thickness of colloidal crystal layer structure 80 is not specifically limited, and the aforementioned thickness is preferably, for example, 10 μm to 5000 μm and more preferably 1000 μm to 3000 μm.

Binder 83 preferably contains, for example, resin. Resin having high light transmittance in a wavelength region within a range of 300 nm to 800 nm can be used for binder 83. The resin used for binder 83 preferably contains at least one selected from a group consisting of acrylic resin, polycarbonate resin, cycloolefin resin, epoxy resin, silicone resin, acrylic-styrene copolymer, styrene resin, and urethane resin.

The plurality of particles 84 contain at least one of an inorganic material or a resin material. As described above, particles 84 may be formed of the inorganic material only or may be formed of the resin material only. Moreover, particles 84 may be formed of both the inorganic material and the resin material.

As the inorganic material, for example, metals such as gold and silver, and metal oxides such as silica, aluminum, and titania can be used. As the resin material, for example, styrene-based resin and acrylic-based resin can be used. The aforementioned materials may be used alone or may be used in combination.

The average particle diameter of particles 84 is typically 1 nm to 1000 nm, preferably 50 nm to 300 nm, and more preferably 70 nm to 280 nm.

The layer thickness of colloidal crystal layer 82 is, for example, preferably 1 μm to 200 μm and more preferably 10 μm to 100 μm. The ratio of light reflected at colloidal crystal layer 82 can be increased with an increase in the layer thickness of colloidal crystal layer 82.

The ratio of the volume of particles 84 with respect to the overall volume of colloidal crystal layer 82 is, for example, preferably 10% by volume to 60% by volume and more preferably 20% by volume to 50% by volume. Moreover, the ratio of the volume of binder 83 with respect the overall volume of colloidal crystal layer 82 is, for example, preferably 40% by volume to 90% by volume and more preferably 50% by volume to 80% by volume. Providing such ranges makes it possible to provide favorable optical transparency and shape stability of colloidal crystal layer 82.

The average value of inter-center distance d1 of particles 84 is preferably 100 nm to 380 nm and more preferably 140 nm to 310 nm. Adjusting the average value of inter-center distance d1 of particles 84 makes it possible to reflect light of a desired wavelength. Note that the average value of inter-center distance d1 of particles 84 can be obtained by observing the front surface of colloidal crystal layer 82 with a scanning electron microscope.

As illustrated in FIG. 6, colloidal crystal layer 82 is only required to be arranged on substrate 81. Colloidal crystal layer 82 may be in contact with the front surface of substrate 81 as illustrated in FIG. 6 but an intervening layer, not illustrated, may be arranged between colloidal crystal layer 82 and substrate 81.

Hereinafter, a method for manufacturing colloidal crystal layer structure 80 will be described. The method for manufacturing colloidal crystal layer structure 80 of the present variation is not specifically limited as long as colloidal crystal layer 82 can be formed. More specifically, colloidal crystal layer structure 80 can be manufactured by dispersing particles 84 in a raw material of binder 83 such as the acrylic resin described above and applying an obtained dispersion solution to, for example, substrate 81 for curing.

A method for applying the dispersion solution is not specifically limited but, for example, any of a spray coat method, a spin coat method, a slit coat method, and a roll coat method can be used. Moreover, a method for polymerizing a monomer is not specifically limited and the monomer may be polymerized by heating or may be polymerized by active energy rays (for example, electromagnetic waves, ultraviolet rays, visible rays, infrared rays, electron beams, or gamma rays). Upon polymerizing the monomer by the active energy rays, photopolymerization initiator or the like may be added to the dispersion solution. Known photopolymerization initiators such as radical photopolymerization initiators, cation photopolymerization initiators, or anion photopolymerization initiators can be used as the photopolymerization initiators.

Note that colloidal crystal layer structure 80 according to the present variation was manufactured in the following manner.

First, silicone particles (manufactured by NIPPON SHOKUBAI Co., Ltd., with an average particle diameter of 180 nm) was added into a triethylene glycol dimethacrylate monomer, which is an example of acrylic resin ("NK Ester 3G" manufactured by SHIN-NAKAMURA CHEMICAL Co., Ltd.) so that the content is 28% by volume. Next, under room temperature (25 degrees Celsius) condition, 20 kHz ultrasonic waves were applied for 10 minutes to disperse the particles so that the particles could be three-dimensionally and regularly arranged in the binder. In the manner described above, a dispersion solution in which colloid particles (silica particles) are uniformly dispersed in the monomer was obtained.

Next, 1.0% by mass of a photopolymerization initiator ("IRGACURE (registered trademark) 1173" manufactured by BASF Corporation) was added into the dispersion solution obtained as described above. Then the dispersion solution was applied to a 200 mm square, 2.0 mm thick acrylic substrate under room temperature (25 degrees Celsius) condition using a bar coater. At this point, the one with count #18 is used as the bar coater. Then ultraviolet light is irradiated to the obtained applied film to polymerize the monomer to thereby obtain colloidal crystal layer structure 80 with colloidal crystal layer 82 formed on the substrate.

As a result of having such colloidal crystal layer 82, part of light irradiated to colloidal crystal layer structure 80 is Bragg reflected and part of the light not reflected is transmitted through colloidal crystal layer structure 80.

Consequently, colloidal crystal layer structure 80 has at least one of reflection wavelength selectivity or transmission wavelength selectivity depending on the incidence angle θ. Note that colloidal crystal layer structure 80 in the present embodiment has high transmittance since substrate 81 and binder 83 with high transmittance are used. Therefore, colloidal crystal layer structure 80 has both the reflection wavelength selectivity and the transmission wavelength selectivity.

Next, periodic uneven layer structure 90 will be described with reference to FIG. 7.

Figure 7:
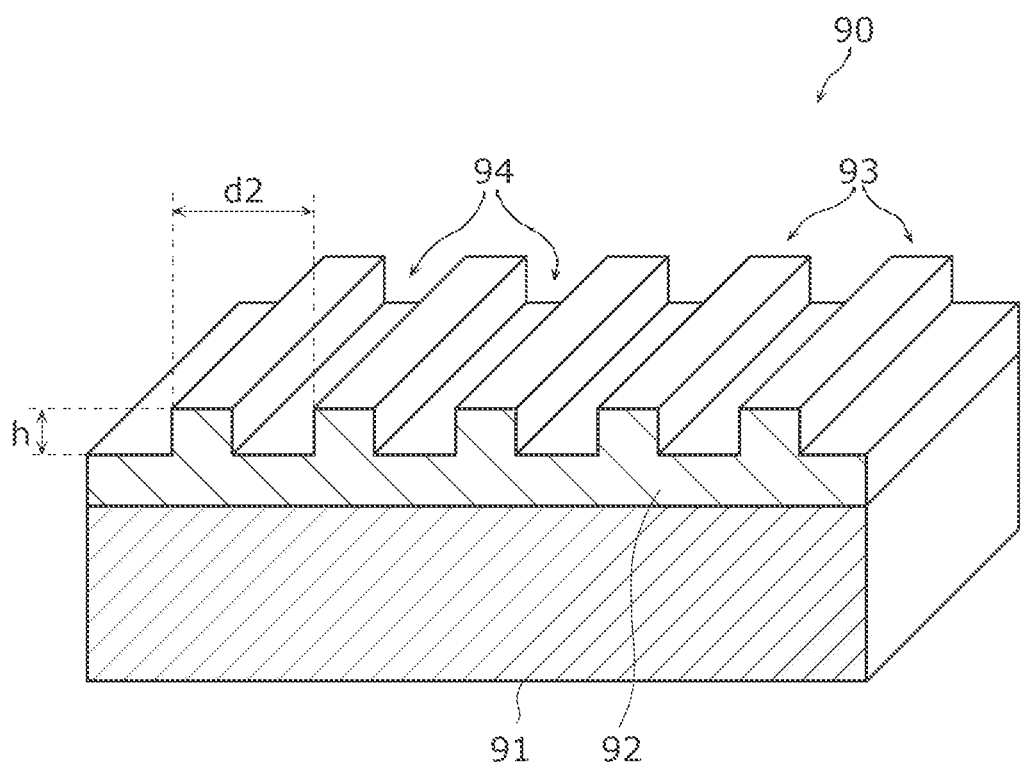
FIG. 7 is a sectional perspective view of a periodic uneven layer structure as one example of an optical member.

FIG. 7 is a sectional perspective view of periodic uneven layer structure 90 as one example of optical member 50. Periodic uneven layer structure 90 includes substrate 91 and periodic uneven layer 92. Periodic uneven layer 92 includes recesses 94. Further, periodic uneven layer 92 includes projections 93. Moreover, an uneven structure in periodic uneven layer 92 may be, for example, a structure such that projections 93 or recesses 94 lies with a hemispherical, columnar, conical, truncated cone, prismatic, pyramidal, or prismatic shape scattered periodically. Moreover, for example, projections 93 or recesses 94 may have a groove-like shape and is formed into a stripe shape.

Periodic uneven layer 92 according to Variation 1 of Embodiment 1 has a plurality of recess 94 of a groove-like shape, which are provided in a stripe form. Moreover, the plurality of recess 94 of a groove-like shape are provided in a row along a direction orthogonal to a stretching direction of recesses 94. Moreover, projections 93 are provided between adjacent recesses 94. The shape of projection 93 in a sectional view is a square in the present variation although the aforementioned shape is not limited to such a shape. That is, periodic uneven layer 92 has an uneven structure shaped into a stripe form in a top view. The thickness of periodic uneven layer 92 is, for example, 1 μm to 50 μm, although the aforementioned thickness is not limited to such a value.

A depth h of recess 94 means the depth of the groove of recess 94. Moreover, pitch d2 of the recess is a pitch between periodic uneven layer 92 and recesses 94 and a distance between adjacent recesses 94. The depth h and pitch d2 are in a visible light wavelength size. More specifically, the visible light wavelength size is 380 nm to 780 nm.

The same material as that of substrate 81 included in colloidal crystal layer structure 80 can be used for substrate 91.

Periodic uneven layer 92 is provided on substrate 91. Periodic uneven layer 92 is formed by use of a photocurable resin material such as an ultraviolet curing resin. Silicone-based resins, acrylic-based resins, and urethane-based resins, etc. can be used as the ultraviolet curable resins. Moreover, for example, a photopolymerization initiator may be added to the ultraviolet curable resins. Well-known photopolymerization initiators such as radical photopolymerization initiators, cation photopolymerization initiators, and anion photopolymerization initiators can be used as the photopolymerization initiator.

Here, a method for manufacturing periodic uneven layer structure 90 will be described. The method for manufacturing periodic uneven layer structure 90 of the present variation is not specifically limited as long as periodic uneven layer 92 can be formed. Periodic uneven layer structure 90 is manufactured by use of a transfer technique using, for example, a nanoimprint device or a roll-to-roll type gravure printing device.

More specifically, applying the ultraviolet curing resin material forming periodic uneven layer 92 to the front surface of substrate 91 forms a resin film on substrate 91. A mold having an uneven structure (that is, a structure obtained by inversing recesses 94 of a groove-like shape) for transferring recesses 94 of a groove-like shape is brought to abut the resin film and ultraviolet rays are irradiated from substrate 91 side in the abutting state to thereby cure the resin film. Consequently, periodic uneven layer 92 having recesses 94 of a groove-like shape is formed. Finally, the mold is removed to thereby form periodic uneven layer structure 90 having recess 94 of a groove-like shape.

As a result of having such periodic uneven layer 92, part of the light irradiated to periodic uneven layer structure 90 is Bragg reflected while part of the light not reflected is transmitted through periodic uneven layer structure 90.

Consequently, periodic uneven layer structure 90 has at least one of the reflection wavelength selectivity or the transmission wavelength selectivity depending on the incidence angle θ. Note that periodic uneven layer structure 90 in the present embodiment can be provided with translucency by use of substrate 91 and periodic uneven layer 92 having translucency. In such a case, periodic uneven layer structure 90 has both the reflection wavelength selectivity and the transmission wavelength selectivity.

Finally, the cholesteric liquid crystal structure will be described.

The cholesteric liquid crystal structure includes a substrate and a cholesteric liquid crystal layer. The same material as the material of substrate 81 included in colloidal crystal layer structure 80 can be used for the substrate included in the cholesteric liquid crystal structure.

The cholesteric liquid crystal layer is a structure having a plurality of layers which include bar-like molecules and are superposed on each other. Moreover, the bar-like molecules at each layer of the cholesteric liquid crystal are arrayed in a fixed direction, and adjacent layers of the cholesteric liquid crystal have a spiral structure having a twisted molecule array. The cholesteric liquid crystal has a refractive index which periodically fluctuates in accordance with the molecule array of each layer, and thus Bragg reflection occurs at an interface of the layers.

Consequently, the cholesteric liquid crystal structure has at least one of the reflection wavelength selectivity or the transmission wavelength selectivity depending on the incidence angle θ. The use of a substrate and a cholesteric liquid crystal layer having translucency can provide the cholesteric liquid crystal structure in the present embodiment with translucency. In the aforementioned case, the cholesteric liquid crystal structure has both the reflection wavelength selectivity and the transmission wavelength selectivity.

[Characteristics of Transmitted Light 52 and Reflected Light 53]

Next, the chromaticity of transmitted light 52 and reflected light 53 in colloidal crystal layer structure 80 will be described in more detail with reference to FIGS. 8 and 9.

First, transmitted light 52 will be described.

Figure 8:
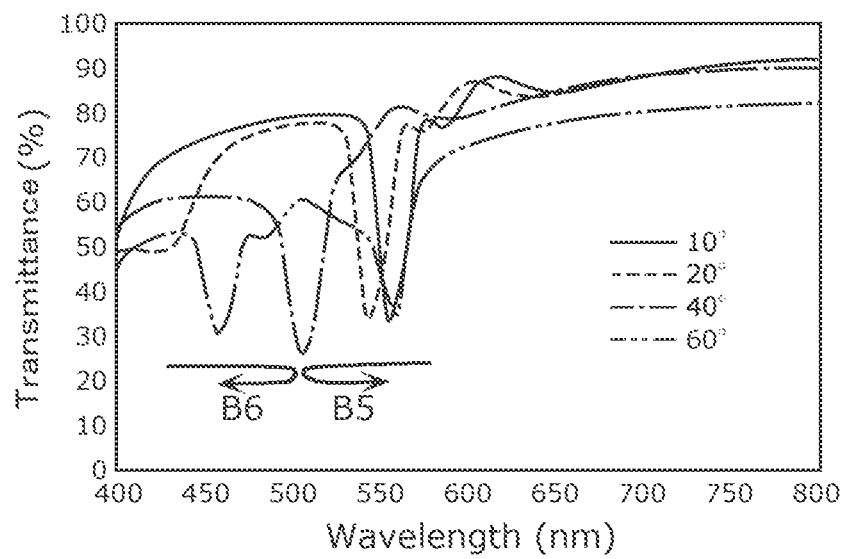
FIG. 8 is a diagram illustrating characteristics of transmitted light released by the colloidal crystal layer structure according to Variation 1 of Embodiment 1.
Figure 8:
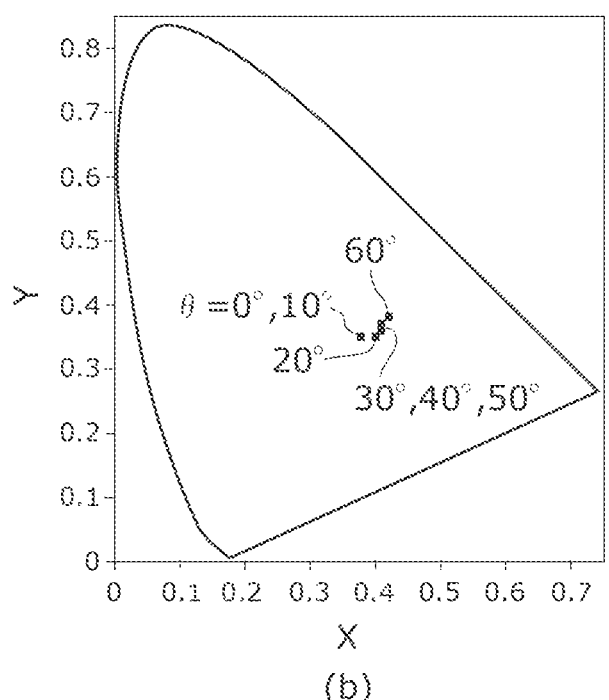

FIG. 8 is a diagram illustrating the characteristics of transmitted light 52 released by colloidal crystal layer structure 80 according to Variation 1 of the present embodiment. More specifically, (a) in FIG. 8 is a diagram illustrating light transmission spectra of colloidal crystal layer structure 80 at different incidence angles θ. Moreover, (b) in FIG. 8 is a chromaticity diagram of transmitted light 52 of colloidal crystal layer structure 80 at the different incidence angles θ.

First, the light transmission spectra of colloidal crystal layer structure 80 will be described with reference to (a) in FIG. 8.

The light transmission spectra according to the present variation are spectra indicating the transmittance of colloidal crystal layer structure 80 for light with wavelengths of 400 nm to 800 nm.

In FIG. 8, (a) illustrates actually measured values of the light transmission spectra when the incidence angles θ of incident light 21 on colloidal crystal layer structure 80 are 10 degrees (indicated by a solid line), 20 degrees (indicated by a dotted line), 40 degrees (indicated by a one-dot chain line), and 60 degrees (indicated by a two-dot chain line). Note that the measurement of the light transmission spectra at incidence angles θ of 0 degrees, 30 degrees, and 50 degrees were carried out but not illustrated for the purpose of avoiding complicatedness in the figure.

Hereinafter, the behavior of the light transmission spectra following the change in the incidence angle θ of incident light 21 on colloidal crystal layer structure 80 will be described.

When the incidence angle θ is 10 degrees (indicated by the solid line), colloidal crystal layer structure 80 has a region with low transmittance centered at a wavelength of 556 nm. Moreover, when the incidence angle θ is 20 degrees (indicated by the dotted line), colloidal crystal layer structure 80 has: a region with low transmittance centered at a wavelength of 425 nm; and a region with low transmittance centered on a wavelength of 544 nm. Next, when the incidence angle θ is 40 degrees (indicated by the one-dot chain line), colloidal crystal layer structure 80 has a region with low transmittance centered at a wavelength of 506 nm. Further, when the incidence angle θ is 60 degrees (indicated by the two-dot chain line), colloidal crystal layer structure 80 has: a region with low transmittance centered at a wavelength of 458 nm; and a region with low transmittance centered at a wavelength of 559 nm.

Specifically, the region with low transmittance shifts as illustrated by arrows B5 and B6 in (a) in FIG. 8 following an increase in the incidence angle θ.

Here, when the incidence angle θ is 40 degrees, the region with low transmittance is observed only in one region centered at the wavelength of 506 nm. As a result of an increase in the incidence angle θ to 40 degrees, the two regions with low transmittance when the incidence angle θ is 20 degrees overlap in the region with low transmittance centered at the wavelength of 506 nm, and thus there is only one region with low transmittance when the incidence angle θ is 40 degrees. More specifically, this phenomenon is a result of a shift of the region with low transmittance centered at the wavelength of 425 nm when the incidence angle θ is 20 degrees towards a long wavelength side and a shift of the region with low transmittance centered at the wavelength of 544 nm towards a short wavelength side. Moreover, the same trends can also be identified for the light transmission spectra at incidence angles θ of 0 degrees, 30 degrees, and 50 degrees.

Specifically, (a) in FIG. 8 illustrates that the regions with low transmittance in the light transmission spectra of colloidal crystal layer structure 80 change following the change in the incidence angle θ. Moreover, colloidal crystal layer structure 80 demonstrates high transmittance with wavelengths other than those in the aforementioned regions with low transmittance. That is, the region with high transmittance changes in the light transmission spectra of colloidal crystal layer structure 80 following a change in the incidence angle θ.

Moreover, a continuous change in the incidence angle θ continuously changes the light transmission spectra in colloidal crystal layer structure 80. As described above, the change in the incidence angle θ changes the optical path length of light and changes the wavelength of reflected light in dielectric multilayer film structure 60 of Embodiment 1. This phenomenon is observed because the behavior of light in colloidal crystal layer structure 80 of the present variation is identical to the behavior of light in dielectric multilayer film structure 60.

That is, the continuous change in the incidence angle θ continuously changes the light transmission spectrum in colloid crystal layer structure 80.

Next, the chromaticity of transmitted light 52 will be described with reference to (b) in FIG. 8.

The chromaticity of transmitted light 52 is calculated through simulation by use of the emission spectrum, illustrated in FIG. 3, of incident light 21 emitted from light source 10 and the light transmission spectrum illustrated in (a) in FIG. 8. More specifically, black squares in (b) in FIG. 8 denotes the chromaticity of transmitted light 52 when the incidence angle θ is changed every 10 degrees from 0 to 60 degrees.

As illustrated in (b) in FIG. 8, xy coordinates of the black squares change following the change in the incidence angle θ. That is, the chromaticity of transmitted light 52 changes following the change in the incidence angle θ.

As illustrated in (a) in FIG. 8, the continuous change in the incidence angle θ continuously changes the light transmission spectrum, and thus the chromaticity of transmitted light 52 continuously changes.

Next, reflected light 53 will be described.

Figure 9:
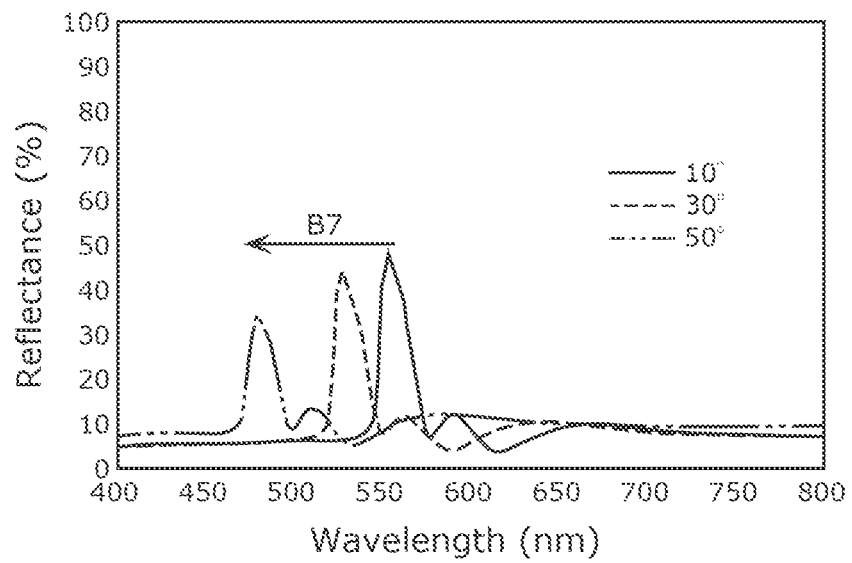
FIG. 9 is a diagram illustrating characteristics of reflected light released by the colloidal crystal layer structure according to Variation 1 of Embodiment 1.
Figure 9:
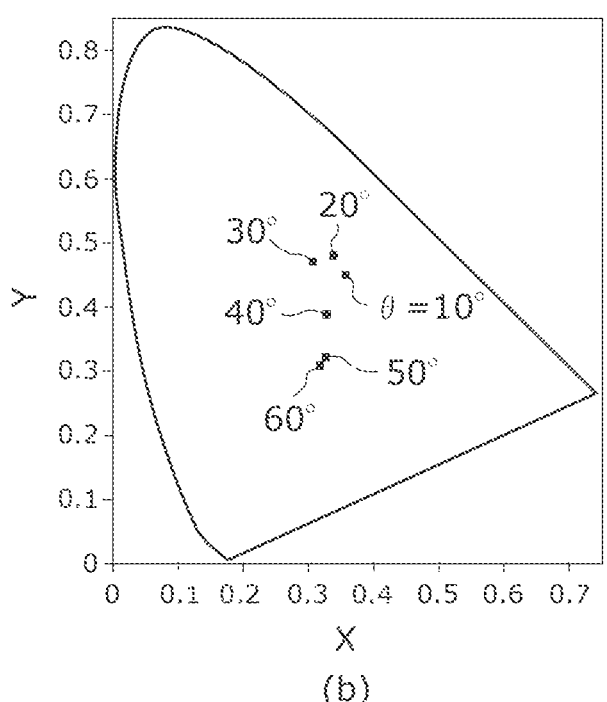

FIG. 9 is a diagram illustrating characteristics of reflected light 53 released by colloidal crystal layer structure 80 according to Variation 1 of the present embodiment. More specifically, (a) in FIG. 9 is a diagram illustrating light reflection spectra of colloidal crystal layer structure 80 at the different incidence angles θ. In FIG. 9, (b) is a chromaticity diagram of reflected light 53 of colloidal crystal layer structure 80 at the different incidence angles θ.

First, the light reflection spectra of colloidal crystal layer structure 80 will be described with reference to (a) in FIG. 9.

The light reflection spectra according to the present variation are spectra indicating the reflectance of colloidal crystal layer structure 80 with respect to light wavelengths of 400 nm to 800 nm.

In FIG. 9, (a) illustrates actually measured values of the light reflection spectrum when the incidence angles θ of incident light 21 on colloidal crystal layer structure 80 are 10 degrees (indicated by a solid line), 30 degrees (indicated by a dotted line), and 50 degrees (indicated by a two-dot chain line). Note that the measurement of the light reflection spectra when the incidence angles θ are 20 degrees, 40 degrees, and 60 degrees were carried out but not illustrated for the purpose of avoiding complicatedness in the figure.

Hereinafter, the behavior of the light reflection spectra following a change in the incidence angle θ of incident light 21 on colloidal crystal layer structure 80 will be described.

When the incidence angle θ is 10 degrees (indicated by the solid line), colloidal crystal layer structure 80 has a peak of reflectance centered at a wavelength of 555 nm. Colloidal crystal layer structure 80 also has a peak of reflectance centered at a wavelength of 526 nm and a peak of reflectance centered at a wavelength of 481 nm at the incidence angles θ of 30 degrees (indicated by the dotted line) and 50 degrees (indicated by the two-dot chain line). That is, as illustrated by arrow B7 in (a) in FIG. 9, the peak of reflectance shifts towards a short wavelength side following an increase in the incidence angle θ. Moreover, the same trends can be identified for the light reflection spectra at the incidence angles θ of 20 degrees, 40 degrees, and 60 degrees, although not illustrated.

Summarizing the above, (a) in FIG. 9 illustrates that a region with high reflectance in the light reflection spectrum of colloidal crystal layer structure 80 changes following the change in the incidence angle θ.

Further, as illustrated in FIG. 8, in terms of the principles of colloidal crystal layer structure 80, a continuous change in the incidence angle θ continuously changes the region with high reflectance. That is, a continuous change in the incidence angle θ continuously changes the light reflection spectrum.

Next, the chromaticity of reflected light 53 will be described with reference to (b) in FIG. 9.

The chromaticity of reflected light 53 is calculated through simulation by use of the emission spectrum, illustrated in FIG. 3, of incident light 21 emitted from light source 10 and the light reflection spectra illustrated in (a) in FIG. 9. More specifically, black squares in (b) in FIG. 9 denote the chromaticity of reflected light 53 when the incidence angle θ is changed every 10 degrees from 10 degrees to 60 degrees.

As illustrated in (b) in FIG. 9, xy coordinates of the black square change following the change in the incidence angle θ. That is, the chromaticity of reflected light 53 changes following the change in the incidence angle θ.

As described above, since the continuous change in the incidence angle θ continuously changes the light reflection spectrum, the chromaticity of reflected light 53 continuously changes.

Summarizing the above, colloidal crystal layer structure 80 of the present variation demonstrates light behavior with the same the trends as trends of dielectric multilayer film structure 60 of Embodiment 1. Moreover, although a detailed description will be omitted, periodic uneven layer structure 90 and the cholesteric liquid crystal structure which perform light reflection or light transmission based on the same principles also demonstrate light behavior with the same trends as the trends of the light behavior of colloidal crystal layer structure 80. Thus, colloidal crystal layer structure 80, periodic uneven layer structure 90, and the cholesteric liquid crystal structure are useful as optical members 50 which have at least one of the reflection wavelength selectivity or the transmission wavelength selectivity depending on the incidence angle θ.

The use of such optical members 50 turns output light 71 into light demonstrating gradation when output light 71 is irradiated onto the so-called irradiated surface. That is, the lighting device has high color rendering usable as a gradation illumination even without including a plurality of light sources which emit light of different colors, that is, even when including only one white light source 10.

On the other hand, since colloidal crystal layer structure 80 of the present variation and dielectric multilayer film structure 60 of Embodiment 1 differ from each other in the transmission and reflection spectra, the chromaticity of light demonstrating graduation is different between the two even when same light source 10 is used. Optical member 50 is appropriately selected in accordance with the application.

[Effects and Others]

As described above, optical member 50 has colloidal crystal layer 82 in the lighting device according to the variation of the present embodiment.

Consequently, optical member 50 which has high wavelength selectivity can be used.

As described above, optical member 50 has periodic uneven layer 92 which has recesses 94 in the lighting device according to the variation of the present embodiment. Moreover, pitch d2 and depth h of recess 94 of periodic uneven layer 92 are in visible light wavelength sizes.

Consequently, optical member 50 which has high wavelength selectivity can be used.

Variation 2 of Embodiment 1

As illustrated in FIG. 2, Embodiment 1 does not refer to the angle of optical member 50 with respect to incident light 21. Variation 2 of Embodiment 1 differs from Embodiment 1 in that an angle formed by the optical axis of incident light 21 and the front surface of optical member 50 is not 90 degrees. Note that components of Variation 2 of Embodiment 1 common to the components of Embodiment 1 will be omitted from a detailed description.

[Configuration]

Figure 10:
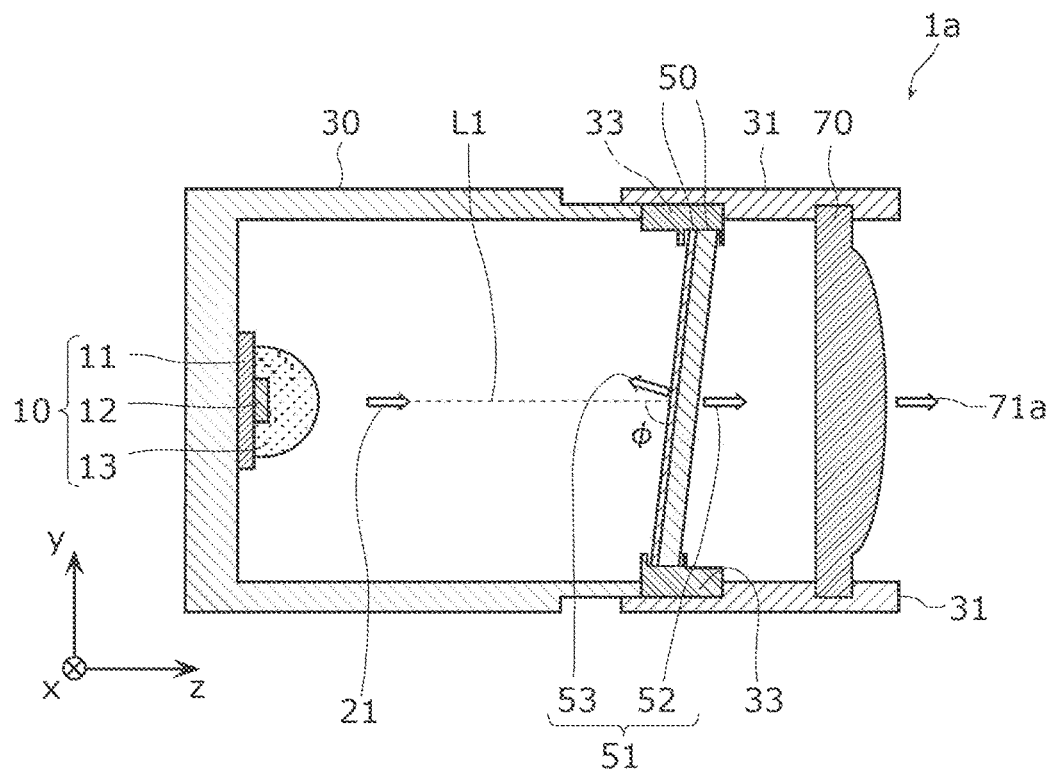
FIG. 10 is a sectional view of a lighting device according to Variation 2 of Embodiment 1.

FIG. 10 is a sectional view of lighting device 1a according to Variation 2 of the present embodiment. White arrows illustrated in FIG. 10 indicate travel directions of light.

Lighting device 1a includes inclined jig 33 in addition to lighting device 1 of Embodiment 1. Lighting device 1a also includes light source 10, housing 30, optical member 50, and translucent member 70, as is the case with lighting device 1 of Embodiment 1. Further, light source 10 has substrate 11, light-emitting element 12, and wavelength conversion layer 13.

Inclined jig 33 is a member which is stored in holder 31 and inclines and fixes optical member 50 in a manner such that the angle formed by the optical axis of incident light 21 and the front surface of optical member 50 is not 90 degrees.

For example, inclined jig 33 is a member which is formed of a metallic material and has a bottomless, cylindrical structure. Inclined jig 33 has an inner curved surface formed with a groove for fixing optical member 50 and has an outer curved surface connected so as to make contact with the inner curved surface of holder 31. Moreover, inclined jig 33 may have a structure detachable from holder 31.

Here, the optical axis is defined as a direction of light emitted from light source 10 and traveling in a direction of light traveling at an angle at which the radiation intensity is highest (for example, optical axis L1 in FIG. 10). Further, the angle formed by optical axis L1 of incident light 21 and the front surface of optical member 50 is more specifically an angle formed by optical axis L1 and the front surface relative to light source 10 in optical member 50. That is, the angle formed by the optical axis of incident light 21 and the front surface of optical member 50 is angle φ in FIG. 10.

Moreover, as is the case with Embodiment 1, incident light 21 is converted into outgoing light 51 through optical member 50. Further, outgoing light 51 contains reflected light 53 reflected by optical member 50 and transmitted light 52 transmitted through optical member 50.

As described above, the chromaticity of output light 71a outputted by lighting device 1a depends on the incidence angle θ of incident light 21. As a result of providing the configuration such that the angle φ is not 90 degrees, the incidence angle θ of incident light 21 on optical member 50 changes and the chromaticity of output light 71a changes, compared to the configuration such that the angle φ is degrees. That is, output light 71a of lighting device 1a demonstrates gradation different from the gradation of output light 71 of lighting device 1 and improves the light color rendering.

[Effects and Others]

As described above, the angle formed by optical axis L1 of incident light 21 and the front surface of optical member 50 is not 90 degrees in lighting device 1a according to Variation 2 of the present embodiment.

Consequently, the incidence angle θ of incident light 21 on optical member 50 changes, the chromaticity of output light 71 changes, and lighting device 1a has high color rendering.

Variation 3 of Embodiment 1

As illustrated in FIG. 2, illustrated in Embodiment 1 is the configuration such that optical member 50 is arranged so as to be fixed inside of housing 30. Variation 3 of Embodiment 1 differs from Embodiment 1 in that optical member 50b is rotatably provided. Note that components of Variation 3 of Embodiment 1 common to the components of Embodiment 1 will be omitted from a detailed description.

[Configuration]

Figure 11:
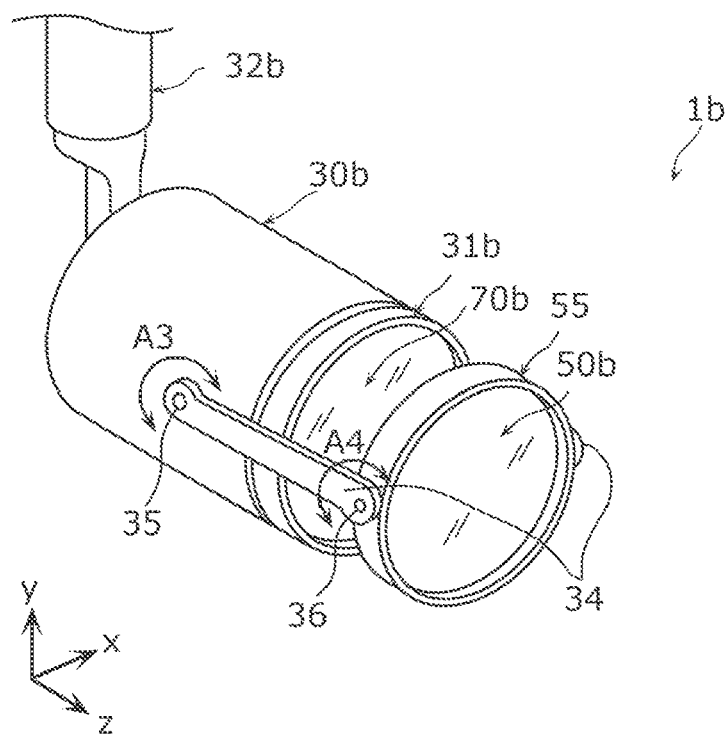
FIG. 11 is a perspective view illustrating the outer appearance of a lighting device according to Variation 3 of Embodiment 1.

FIG. 11 is a perspective view illustrating the outer appearance of lighting device 1b according to Variation 3 of the present embodiment.

Optical member 50b included in lighting device 1b is rotatably provided. Since lighting device 1b has optical member 50b rotatably provided, lighting device 1b may include, for example, first rotation connector 35, second rotation connector 36, a pair of arms 34, and fixing part 55. Moreover, optical member 50b included in lighting device 1b may be provided outside of housing 30b. Lighting device 1b of Variation 3 differs from Embodiment 1 in that optical member 50b is rotatably provided, that lighting device 1b includes first rotation connector 35, second rotation connector 36, the pair of arms 34, and fixing part 55, and that optical member 50b is provided outside of housing 30b.

Moreover, lighting device 1b includes holder 31b and supporter 32b similar to holder 31 and supporter 32 included in lighting device 1 of Embodiment 1.

Fixing part 55 is a member for fixing optical member 50b. For example, fixing part 55 is a member which is formed of a metallic material and has a bottomless, cylindrical structure. Further, optical member 50b is fixed on an inner curved surface of fixing part 55. Moreover, an outer curved surface of fixing part 55 is connected to the pair of arms 34.

The pair of arms 34 of a cylindrical shape is a member for connecting fixing part 55 and housing 30b. For example, the pair of arms 34 is formed of a metallic material and configured to have a pair of members having a flat plate-like structure. That is, there are two members having a flat plate-like structure, forming the pair of arms 34.

Two first rotation connectors 35 are provided at respective ends (in the negative z-axis direction in FIG. 11) of the pair of arms 34. First rotation connector 35 provided at one of the pair of arms 34 and first rotation connector 35 provided at another one of the pair of arms 34 sandwich housing 30b. Thus, first rotation connectors 35 are rotatably connected to housing 30b.

Moreover, two second rotation connectors 36 are provided at respective another ends of the pair of arms 34 (in the positive z-axis direction in FIG. 11). Second rotation connector 36 provided at one of the pair of arms 34 and second rotation connector 36 provided at another one of the pair of arms 34 sandwich fixing part 55. Thus, second rotation connectors 36 are rotatably connected to fixing part 55.

First rotation connectors 35 are connected so as to rotate (arrow A3 in FIG. 11) fixing part 55 in a vertical direction (along a plane yz), and rotation connectors 36 are connected so as to rotate (arrow A4 in FIG. 11) fixing part 55 serving as an x-axis.

Optical member 50b is fixed at fixing part 55 and thus can be located in an upward direction (the positive y-axis direction) from housing 30b, in a downward direction (the negative y-axis direction) from housing 30b, or in a light outgoing direction (in the positive z-axis direction) from housing 30b.

Moreover, optical member 50b can be rotated with an x-axis serving as an axis through the rotation of second rotation connectors 36.

Optical member 50b is not located inside of housing 30b in lighting device 1b. Thus, light released from translucent member 70b is light emitted from light source 10.

As a result of arranging optical member 50b in the light outgoing direction (in the positive z-axis direction) from housing 30b, the white light released from translucent member 70b is incident on optical member 50b. Moreover, as a result of arranging optical member 50b in the upward direction (the positive y-axis direction) from housing 30b or in the downward direction (the negative y-axis direction) of housing 30b, the white light released from translucent member 70b is not incident on optical member 50b.

Specifically, the rotation of second rotation connectors 36 makes it possible to change and control the incidence angle θ at which the white light released from translucent member 70b is incident on optical member 50b. Consequently, it is easy to control the chromaticity of the light emitted from lighting device 1b. That is, it is possible to improve the color rendering of the gradation light as the light emitted from lighting device 1b.

Further, the rotation of first rotation connectors 35 makes it possible to control whether or not to make the light, which has been released from translucent member 70b, incident on optical member 50b. Consequently, it is possible to select whether the light emitted from lighting device 1b is gradation light or white light.

[Effects and Others]

Specifically, lighting device 1b according to Variation 3 of Embodiment 1 is lighting device 1b which outputs output light. Lighting device 1b includes: a light source; and optical member 50b which has at least one of the reflection wavelength selectivity or the transmission wavelength selectivity depending on the incidence angle θ of incident light from the light source. The incident light is incident on optical member 50b at a plurality of different incidence angles. The incident light is converted into outgoing light through optical member 50b, and the outgoing light includes reflected light reflected by optical member 50b and transmitted light transmitted through the optical member. Output light is light based on the outgoing light, optical member 50b is rotationally provided, and the chromaticity of the output light continuously changes on the irradiated surface irradiated by the output light.

Consequently, it is easy to control the chromaticity of the light emitted from lighting device 1b. That is, it is possible to improve the color rendering of gradation light as the light emitted from lighting device 1b.

Embodiment 2

As illustrated in FIG. 2, output light 71 of lighting device 1 of Embodiment 1 is configured to include transmitted light 52 which is transmitted through optical member 50. Embodiment 2 differs from Embodiment 1 in a configuration such that output light 71c uses both reflected light 53c and transmitted light 52c. Note that components of Embodiment 2 common to the components of Embodiment 1 will be omitted from a detailed description.

[Configuration]

First, the configuration of lighting device 1c according to the present embodiment will be described with reference to FIGS. 12 and 13.

Figure 12:
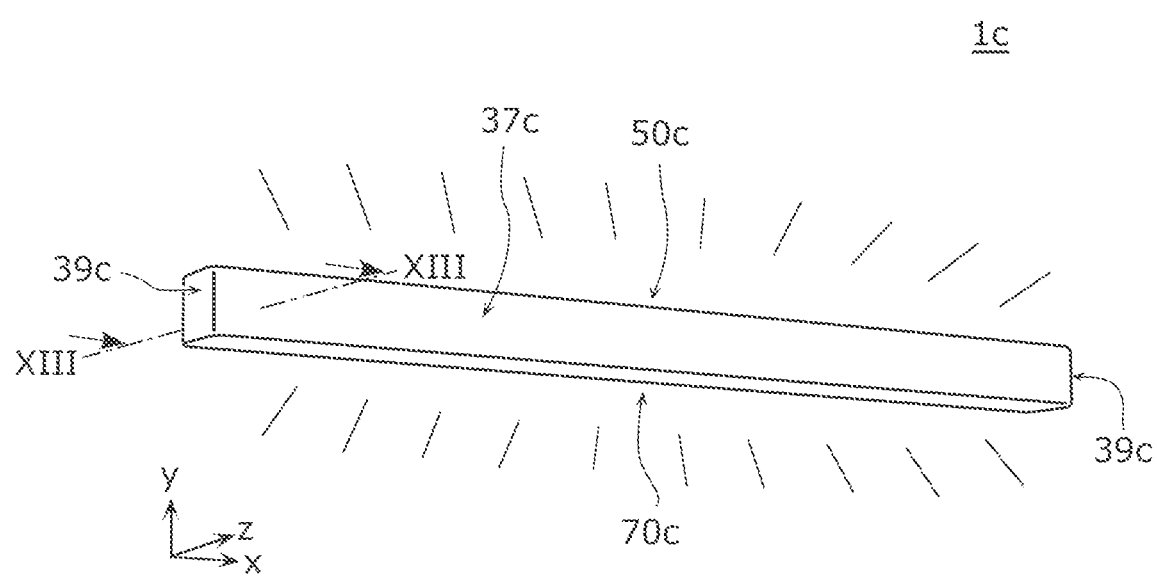
FIG. 12 is a perspective view of a lighting device according to Embodiment 2.

FIG. 12 is a perspective view illustrating the outer appearance of lighting device 1c according to the present embodiment. FIG. 13 is a sectional view of lighting device 1c taken along line XIII-XIII in FIG. 12. Note that a longitudinal direction of lighting device 1c is defined as an x-axis direction and two directions perpendicular to the x-axis direction and orthogonal to each other are provided as a y-axis direction and a z-axis direction in each of the figures. In the present embodiment, the y-axis direction is a vertical direction. FIG. 13 illustrates a cross section parallel to a plane yz of lighting device 1. An upward direction denotes a positive y-axis direction and a downward direction denotes a negative y-axis direction in the present embodiment. Moreover, white arrows illustrated in FIG. 13 indicate light travel directions.

Lighting device 1c of the present embodiment is a device which is attached on a ceiling surface, a floor surface, and a wall surface in a space. In the present embodiment, lighting device 1c is an illumination fitting such as a bracket light which is attached to the wall surface in the space and vertically outputs light.

Lighting device 1c outputs output light 71c. Lighting device 1c includes light source 10c and optical member 50c. Further, lighting device 1c of the present embodiment includes holder 31c, housing front surface part 37c, housing rear surface part 38c, housing side surface part 39c, and translucent member 70c.

Hereinafter, components of lighting device 1c will be described. First, the outer appearance of lighting device 1c will be described.

Housing front surface part 37c, housing rear surface part 38c, and holder 31c integrally support light source 10c, optical member 50c, and translucent member 70c. For example, housing front surface part 37c, housing rear surface part 38c, housing side surface part 39c, and holder 31c are members which are formed of a metallic material.

Housing front surface part 37c and housing rear surface part 38c have a plate-like structure. Housing front surface part 37c and housing rear surface part 38c have projections which are respectively provided in the upward direction (the positive y-axis direction) and the downward direction (the negative y-axis direction) and support optical member 50c and translucent member 70c. Moreover, the projections have a structure which extends along the longitudinal direction (the x-axis) of lighting device 1c and support optical member 50c and translucent member 70c.

Moreover, housing rear surface part 38c is provided in a manner such that an outer side surface of housing rear surface part 38c makes contact with the wall surface in the space where lighting device 1c is attached. That is, in FIG. 13, the wall surface in the space where lighting device 1c is attached lies on a negative z-axis direction side of housing rear surface part 38c. Housing front surface part 37c is provided on a side opposite to the wall surface in the space, opposing housing rear surface part 38c.

Holder 31c includes a pair of upper holders 311c which are located in an upward direction (the positive y-axis direction) from housing front surface part 37c and housing rear surface part 38c. Similarly, holder 31c includes a pair of lower holders 312c which are located in a downward direction (the negative y-axis direction) from housing front surface part 37c and housing rear surface part 38c.

Figure 13:
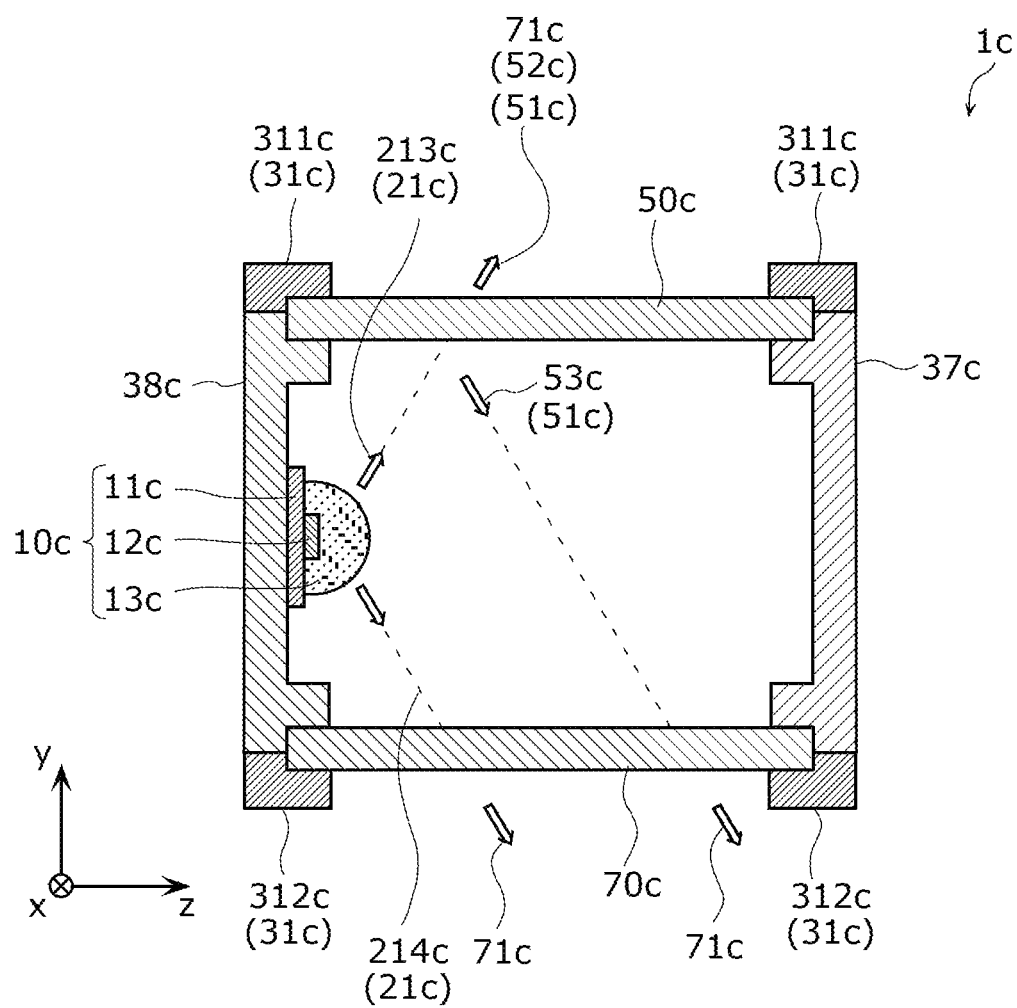
FIG. 13 is a sectional view of the lighting device, taken along line XIII-XIII in FIG. 12.

As illustrated in FIG. 13, the pair of upper holders 311c and the pair of lower holders 312c are each L-shaped in a cross section and have a bar-like structure which extends along the longitudinal direction (x-axis) of lighting device 1c while the L-shape is intact. Moreover, the pair of upper holders 311c and the pair of lower holders 312c are each formed of a metallic material.

Moreover, the pair of upper holders 311c and the projections of housing front surface part 37c and housing rear surface part 38c support optical member 50c. Further, the pair of lower holders 312c and the projections of housing front surface part 37c and housing rear surface part 38c support translucent member 70c. Any method is accepted as a supporting method in portions where the aforementioned supports are provided, but for example, a sticking material may be provided in the support portions for the supports.

Housing side surface parts 39c are provided one each at both ends of lighting device 1c in a longitudinal direction (along the x-axis) and each have a plate-like structure. More specifically, housing side surface part 39c is provided and connected at both of the ends in the longitudinal direction (along the x-axis) so as to cover housing front surface part 37c, housing rear surface part 38c, holder 31c, optical member 50c, and translucent member 70c. Any method is permitted as a method for connection to the other components in the portion where housing side surface part 39c is provided, but, for example, a sticking material may be provided in the support portions for the connection.

Lighting device 1c further includes a controller and a power supply, as is the case with lighting device 1 of Embodiment 1.

Moreover, optical member 50c is provided at the top (in the positive y-axis direction) of lighting device 1c, and translucent member 70c is provided at the bottom (in the negative y-axis direction) of lighting device 1c.

Hereinafter, light source 10c, optical member 50c, and translucent member 70c will be described in more detail.

Light source 10c emits light towards optical member 50c and translucent member 70c. Further, light source 10c according to the present embodiment emits diffused light. Light source 10c according to the present embodiment isotropically emits white diffused light. Light source 10c also has substrate 11c, light-emitting element 12c, and wavelength conversion layer 13c.

Substrate 11c, light-emitting element 12c, and wavelength conversion layer 13c have the same configurations as the configurations of substrate 11, light-emitting element 12, and wavelength conversion layer 13 of Embodiment 1.

Light source 10c is located on an inner side surface of housing rear surface part 38c. Specifically, light source 10c is provided in a manner such that a surface of substrate 11c where light-emitting element 12c is not formed and the inner side surface of housing rear surface part 38c make contact with each other. Providing such a configuration permits light source 10c to emit light from the inner side surface of housing rear surface part 38c in the upward direction (the positive y-axis direction) from lighting device 1c and in the downward direction (the negative y-axis direction) from lighting device 1c. The light emitted from light source 10c turns into incident light 21c and arrives at optical member 50c and translucent member 70c. For example, incident light 21c includes: incident light 213c which is directed towards optical member 50c; and incident light 214c which is directed towards translucent member 70c. Incident light 21c is incident on optical member 50c at a plurality of different incidence angles θ.

Note that lighting device 1c according to the present embodiment includes one light source 10c in FIG. 13 but the number of light sources 10c is not limited to this number. Lighting device 1c may include a plurality of light sources 10c, which may be arranged in parallel to each other in the x-axis direction.

Optical member 50c has a flat plate structure and is sandwiched by housing front surface part 37c, housing rear surface part 38c, and upper holders 311c in the present embodiment.

The behavior of optical member 50c on light is identical to the behavior of optical member 50 of Embodiment 1. Specifically, optical member 50c has at least one of the reflection wavelength selectivity or the transmission wavelength selectivity depending on the incidence angle θ of incident light 21 from light source 10c. Optical member 50c has the reflection wavelength selectivity and the transmission wavelength selectivity in the present embodiment. That is, optical member 50c selectively reflects part of incident light 21c and transmits another part of incident light 21c depending on the incidence angle θ.

Moreover, incident light 21c is converted into outgoing light 51c through optical member 50c. Specifically, incident light 213c is converted into outgoing light 51c through optical member 50c. Further, outgoing light 51c includes reflected light 53c reflected by optical member 50c and transmitted light 52c transmitted through optical member 50c. That is, incident light 21c (incident light 213c in the present embodiment) arriving at optical member 50c turns into reflected light 53c when reflected by optical member 50c and turns into transmitted light 52c when transmitted through optical member 50c.

Transmitted light 52c released in the upward direction (the positive y-axis direction) from lighting device 1c turns into light outputted from lighting device 1c, that is, output light 71c. That is, output light 71c includes transmitted light 52c.

Moreover, optical member 50c has dielectric multilayer film 62, colloidal crystal layer 82, or periodic uneven layer 92, as is the case with optical member 50 of Embodiment 1. A detailed structure of optical member 50c is identical to the structure of optical member 50 of Embodiment 1.

The same material as the material of translucent member 70 of Embodiment 1 can be used for translucent member 70c. Further, translucent member 70c has a flat plate structure not having the shape of a convex lens, which is not the case with translucent member 70 of Embodiment 1, and is sandwiched by housing front surface part 37c, housing rear surface part 38c, and lower holders 312c. Moreover, translucent member 70c transmits incident light 21c (incident light 214c in the present embodiment) and reflected light 53c in the downward direction (the negative y-axis direction) from lighting device 1c.

Reflected light 53c emitted in the downward direction (the negative y-axis direction) from lighting device 1c turns into light outputted from lighting device 1c, that is, output light 71c. That is, output light 71c includes reflected light 53c. Similarly, incident light 214c emitted in the downward direction (the negative y-axis direction) from lighting device 1c turns into light outputted from lighting device 1c, that is, output light 71c. That is, output light 71c includes reflected light 53c and incident light 214c.

Summarizing the above, output light 71c in the present embodiment includes transmitted light 52c and reflected light 53c. Since outgoing light 51c includes transmitted light 52c and reflected light 53c, output light 71c in the present embodiment is light based on outgoing light 51c.

Moreover, as illustrated in Embodiment 1, the light transmitted through optical member 50 is light demonstrating gradation. Therefore, output light 71c based on transmitted light 52c turns into light demonstrating gradation.

Further, translucent member 70c is formed of a material with high light transmission, and thus the chromaticity of reflected light 53c and incident light 214c do not change before and after the transmission through translucent member 70c. That is, output light 71c based on incident light 214c is white light. Moreover, as illustrated in Embodiment 1, light reflected by optical member 50c is light demonstrating gradation. Therefore, output light 71c based on reflected light 53c turns into light demonstrating gradation.

Summarizing the above, output light 71c is configured to use both reflected light 53 and transmitted light 52 in lighting device 1c of the present embodiment. Moreover, output light 71c released in the upward direction (the positive y-axis direction) turns into gradation light and output light 71c released in the downward direction (the negative y-axis direction) turns into blended light of white light and the gradation light in lighting device 1c. Consequently, the color rendering of lighting device 1c more improves.

[Effects and Others]

Moreover, output light 71c includes reflected light 53c and transmitted light 52c in lighting device 1c according to the present embodiment.

Consequently, lighting device 1c can use the gradation light of both reflected light 53c and transmitted light 52c of optical member 50c as output light 71c. Thus, the color rendering of lighting device 1c more improves.

[Others]

The lighting devices according to the embodiments have been described above, but the present invention is not limited to the embodiments described above.

In each of the embodiments, a light source which emits diffused light has been used, but the light source is not limited to such a light source. For example, the light source may emit parallel light. The parallel light emitted from the light source may turn into incident light and then be incident on the optical member after light distribution is controlled by an optical lens or the like. With the aforementioned configuration, as a result of the control of the light distribution by the optical lens, the incident light based on the parallel light emitted from the light source is incident on the optical member at a plurality of different incidence angles.

Note that the optical member has the disk structure in each of the embodiments but the structure of the optical member is not limited to such a structure. For example, the optical member may have a disk structure and may further have a double-sided convex lens structure with a convex structure provided on both circular surfaces of the aforementioned disk structure. In the aforementioned case, the surface of the optical member on which the incident light is incident is a curved surface. Thus, in both of a case where the light emitted by the light source is parallel light and a case where the aforementioned light is diffused light, the incident light based on the light emitted from the light source is incident on the optical member at the plurality of different incidence angles.

Further, when the optical member is formed by use of a configuration such that the optical member has flexibility such as that possessed by a film, the optical member may be curved while installed in the lighting device. Also in the aforementioned case, the surface of the optical member on which the incident light is incident is a curved surface, as is the case with the above. Thus, in both of the case where the light emitted by the light source is parallel light and the case where the aforementioned light is diffused light, the incident light based on the light emitted from the light source is incident on the optical member at the plurality of different incidence angles.

The optical member according to each of the embodiments has at least one of the reflection wavelength selectivity or the transmission wavelength selectivity depending on the incidence angle of the incident light from the light source. Further, the optical member according to each embodiment has both the reflection wavelength selectivity and the transmission wavelength selectivity. Thus, the optical member selectively reflects part of the incident light and transmits another part of the incident light, depending on the incidence angle, although the behavior of the optical member is not limited to such behavior. For example, the optical member according to each embodiment may have only the reflection wavelength selectivity and may absorb light, other than the reflected light, included in the incident light from the light source. That is, output light of the lighting device according to each embodiment may be light only provided by the reflected light only.

Note that the irradiated surface in each embodiment is, for example, a surface of an inside of a building such as the ceiling surface, the floor surface, and the wall surface in the space, although the irradiated surface is not limited to such a surface. For example, gas such as smoke, a liquid such as rain drops, and fine particles scattered in the space can also be provided as the irradiated surface.

Moreover, the inventors have found the possibility that the chromaticity of the output light on the irradiated surface more largely changes with an increase in the half value width of a reflection spectrum (or a transmission spectrum) of the optical member.

For example, for the purpose of explanation, the characteristics (FIG. 5) of reflected light 53 of dielectric multilayer film structure 60 and the characteristics (FIG. 6) of reflected light 53 of colloidal crystal layer structure 80 will be compared with each other. A change in the chromaticity of dielectric multilayer film structure 60 when the incidence angle θ is changed is larger than a change in the chromaticity of colloidal crystal layer structure 80 when the incidence angle θ is changed. This is supposed by the inventors due to the fact that the half-value width of a reflection peak in the reflection spectrum of dielectric multilayer film structure 60 is larger than the half-value width of a reflection peak in the reflection spectrum of colloidal crystal layer structure 80.

That is, the inventors have found out the possibility that the half-value with of the reflection spectrum (or the transmission spectrum) of the optical member can be controlled to control the chromaticity of the output light.

In addition, the present invention also includes: a mode obtained by making various modifications, conceivable to those skilled in the art, to each of the embodiments described above; and a mode realized by combining together the components and the functions in each of the embodiments in a desired manner without departing from the spirits of the present invention.

REFERENCE SIGNS LIST 1 lighting device
10 light source
21 incident light
50 optical member
51 outgoing light
52 transmitted light
53 reflected light
62 dielectric multilayer film
71 output light
82 colloidal crystal layer
92 periodic uneven layer
94 recess
d2 pitch
h depth
L1 optical axis

The invention claimed is:

1. A lighting device which outputs output light, the lighting device comprising:
   a light source; and
   an optical member which includes at least one of reflection wavelength selectivity or transmission wavelength selectivity depending on an incidence angle of incident light from the light source, wherein
   the incident light is incident on the optical member at a plurality of different incidence angles,
   the incident light is converted into outgoing light through the optical member,
   the outgoing light includes reflected light reflected by the optical member and transmitted light transmitted through the optical member,
   the output light is light based on only the reflected light out of the reflected light and the transmitted light that are included in the outgoing light, and
   chromaticity of the output light continuously changes on a surface irradiated by the output light.

2. The lighting device according to claim 1, wherein
   an angle formed by an optical axis of the incident light and a surface of the optical member is not 90 degrees.

3. The lighting device according to claim 1, wherein
   the incident light is diffused light.

4. The lighting device according to claim 1, wherein
   the optical member includes a dielectric multilayer film.

5. The lighting device according to claim 1, wherein
   the optical member includes a colloidal crystal layer.

6. The lighting device according to claim 1, wherein
   the optical member includes a periodic uneven layer including a recess, and
   a pitch and a depth of the recess are in visible light wavelength sizes.

7. An optical member used for a lighting device which outputs output light, the optical member
   having at least one of reflection wavelength selectivity or transmission wavelength selectivity depending on an incidence angle of incident light,
   receiving the incident light which is incident at a plurality of different incidence angles,
   converting the incident light into outgoing light, wherein
   the outgoing light includes reflected light subjected to reflection and transmitted light subjected to transmission,
   the output light is light based on only the reflected light out of the reflected light and the transmitted light that are included in the outgoing light, and
   chromaticity of the output light continuously changes on a surface irradiated by the output light.

8. The lighting device according to claim 1, wherein
   the optical member is rotatable with a predetermined direction serving as an axis.

* * * * *